United States Patent
Zunger et al.

(10) Patent No.: US 8,352,424 B2
(45) Date of Patent: Jan. 8, 2013

(54) SYSTEM AND METHOD FOR MANAGING REPLICAS OF OBJECTS IN A DISTRIBUTED STORAGE SYSTEM

(75) Inventors: Yonatan Zunger, Mountain View, CA (US); Alexandre Drobychev, San Jose, CA (US); Alexander Kesselman, Sunnyvale, CA (US); Rebekah C. Vickrey, Mountain View, CA (US); Frank C. Dachille, Mountain View, CA (US); George Datuashvili, Cupertino, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/022,290

(22) Filed: Feb. 7, 2011

(65) Prior Publication Data

US 2011/0196830 A1     Aug. 11, 2011

Related U.S. Application Data

(60) Provisional application No. 61/302,936, filed on Feb. 9, 2010.

(51) Int. Cl.
G06F 7/00 (2006.01)
G06F 17/00 (2006.01)

(52) U.S. Cl. ........ 707/610; 707/611; 707/612; 707/624; 707/625; 709/248

(58) Field of Classification Search .................. None
See application file for complete search history.

(56) References Cited

U.S. PATENT DOCUMENTS

| | | | |
|---|---|---|---|
| 6,167,427 A | 12/2000 | Rabinovich et al. | |
| 6,728,751 B1 | 4/2004 | Cato et al. | |
| 6,857,012 B2 | 2/2005 | Sim et al. | |
| 7,107,419 B1 | 9/2006 | Ghemawat et al. | |
| 7,251,670 B1 | 7/2007 | Day | |
| 7,293,154 B1 * | 11/2007 | Karr et al. ................. | 711/202 |

(Continued)

FOREIGN PATENT DOCUMENTS

EP   1 860 542 A2   11/2007

OTHER PUBLICATIONS

Google Inc., PCT/US2011/024246, Feb. 9, 2011, International Search Report and Written Opinion mailed Apr. 26, 2011, 9 pgs.

(Continued)

Primary Examiner — Angelica Ruiz
(74) Attorney, Agent, or Firm — Morgan, Lewis & Bockius LLP

(57) ABSTRACT

A system and method for generating replication requests for objects in a distributed storage system is provided. Replication requests for objects in a distributed storage system are generated based at least in part on replication policies for the objects and a current state of the distributed storage system, wherein a respective replication request for a respective object instructs a respective instance of the distributed storage system to replicate the respective object so as to at least partially satisfy a replication policy for the respective object, wherein a respective replication policy includes criteria specifying at least storage device types on which replicas of object are to be stored. At least a subset of the replication requests is then distributed to the respective instances of the distributed storage system for execution.

24 Claims, 22 Drawing Sheets

U.S. PATENT DOCUMENTS

| | | | |
|---|---|---|---|
| 7,320,059 B1 | 1/2008 | Armangau et al. | |
| 7,450,503 B1 | 11/2008 | Ginjpalli et al. | |
| 7,558,927 B2 | 7/2009 | Clark et al. | |
| 7,567,973 B1 | 7/2009 | Burrows et al. | |
| 7,647,329 B1 * | 1/2010 | Fischman et al. | 707/999.1 |
| 7,653,668 B1 | 1/2010 | Shelat et al. | |
| 7,660,836 B2 | 2/2010 | Bolik et al. | |
| 7,716,171 B2 | 5/2010 | Kryger | |
| 7,761,678 B1 | 7/2010 | Bodmer et al. | |
| 7,778,972 B1 * | 8/2010 | Cormie et al. | 707/626 |
| 7,778,984 B2 | 8/2010 | Zhang et al. | |
| 7,885,928 B2 | 2/2011 | Harrington et al. | |
| 8,010,514 B2 | 8/2011 | Zhang et al. | |
| 8,099,388 B2 | 1/2012 | Shen et al. | |
| 2002/0147774 A1 | 10/2002 | Lisiecki et al. | |
| 2003/0149709 A1 | 8/2003 | Banks | |
| 2004/0199810 A1 | 10/2004 | Tarcea et al. | |
| 2005/0198359 A1 * | 9/2005 | Basani et al. | 709/232 |
| 2006/0026219 A1 | 2/2006 | Orenstein et al. | |
| 2006/0112140 A1 | 5/2006 | McBride et al. | |
| 2006/0221190 A1 | 10/2006 | Limberis et al. | |
| 2007/0050415 A1 | 3/2007 | Armangau et al. | |
| 2007/0078901 A1 | 4/2007 | Satou et al. | |
| 2007/0156842 A1 | 7/2007 | Vermeulen et al. | |
| 2007/0203910 A1 | 8/2007 | Ferguson et al. | |
| 2007/0283017 A1 | 12/2007 | Anand et al. | |
| 2008/0027884 A1 * | 1/2008 | Boutault | 705/400 |
| 2008/0147821 A1 | 6/2008 | Dietrich et al. | |
| 2009/0083342 A1 | 3/2009 | Tomic et al. | |
| 2009/0083563 A1 | 3/2009 | Murase | |
| 2009/0228532 A1 | 9/2009 | Anzai | |
| 2009/0240664 A1 | 9/2009 | Dinker et al. | |
| 2009/0265519 A1 * | 10/2009 | Moore et al. | 711/162 |
| 2009/0271412 A1 * | 10/2009 | Lacapra et al. | 707/10 |
| 2009/0276408 A1 | 11/2009 | Auerbach et al. | |
| 2009/0327602 A1 * | 12/2009 | Moore et al. | 711/114 |
| 2010/0017037 A1 | 1/2010 | Nam et al. | |
| 2010/0094981 A1 * | 4/2010 | Cordray et al. | 709/222 |
| 2010/0138495 A1 | 6/2010 | McIntyre et al. | |
| 2010/0189262 A1 | 7/2010 | Ducharme et al. | |
| 2010/0325476 A1 | 12/2010 | Zhang et al. | |
| 2011/0185013 A1 | 7/2011 | Obata et al. | |
| 2011/0238625 A1 | 9/2011 | Hamaguchi et al. | |

OTHER PUBLICATIONS

Google Inc., PCT/US2011/024247, Feb. 9, 2011, International Search Report and Written Opinion mailed Sep. 23, 2011, 15 pgs.

Google Inc., PCT/US2011/024249, Feb. 9, 2011, International Search Report and Written Opinion mailed Apr. 26, 2011, 10 pgs.

Chang et al., "Bigtable: A Distributed Storage System for Structured Data," OSDI, Oct. 31, 2006, 1-14 pgs.

Ghemawat et al., "The Google File System," SOSP' 03, Oct. 19-22, 2003, 15 pgs.

Google Code, "Protocol Buffers Language Guide," Jul. 11, 2008, 16 pgs. http://code.google.com/apis/protocolbuffers/docs/proto.html.

Korn et al., "The VCDIFF Generic Differencing and Compression Data Format," RFC 3284, Jun. 2002, 1-29 pgs.

Barrett, How Index Building Works, Google Code, Nov. 24, 2008, 3 pgs.

* cited by examiner

Exemplary Server Allocation

| Task / Function | Typical Number of Servers at an Instance |
|---|---:|
| Blobmaster | 10 |
| Bitpusher | 100 |
| BigTable Servers | 50 |
| File System Servers | 1000 |
| Tape Servers | 10 |
| Tape Master | 5 |
| Replication Management | 10 |
| Quorum Clock Server | 5 |

502 — Blobmaster
504 — Bitpusher
506 — BigTable Servers
508 — File System Servers
510 — Tape Servers
512 — Tape Master
514 — Replication Management
516 — Quorum Clock Server

Figure 5

SYSTEM AND METHOD FOR MANAGING REPLICAS OF OBJECTS IN A DISTRIBUTED STORAGE SYSTEM

PRIORITY

This application claims priority to U.S. Provisional Application Ser. No. 61/302,936, filed Feb. 9, 2010, entitled "System and Method for Managing Replicas of Objects In A Distributed Storage System", which is incorporated by reference herein in its entirety.

TECHNICAL FIELD

The disclosed embodiments relate generally to managing replicas of objects in a distributed storage system.

BACKGROUND

The enterprise computing landscape has recently undergone a fundamental shift in storage architectures in which the central-service architecture has given way to distributed storage systems. Distributed storage systems built from commodity computer systems can deliver high performance, availability, and scalability for new data-intensive applications at a fraction of cost compared to monolithic disk arrays. To unlock the full potential of distributed storage systems, data is replicated across multiple instances of the distributed storage system at different geographical locations, thereby increasing availability and reducing network distance from clients.

In a distributed storage system, objects are dynamically created and deleted in different instances of the distributed storage system. However, different replication requests may have different priorities. It is important to execute replication requests in priority order so as to replicate the more important objects first. For example, a newly uploaded object has just one replica. Thus, it is more important to create replicas of the new object before creating replicas of existing objects that already has a plurality of replicas in order to minimize the probability of data loss in the new object. Another example is a video that becomes a hit over night. In this case, the number of replicas of the video needs to be increased as soon as possible in order to handle the increased demand. Therefore, it is desirable to properly prioritize replication requests and execute them in a timely fashion while sustaining very high loads.

In a small-scale distributed storage system, managing replicas of objects is a tractable problem. However, there are no existing techniques for managing replicas of objects in a planet-wide distributed storage system that includes trillions of objects, petabytes of data, dozens of data centers across the planet.

SUMMARY

To address the aforementioned deficiencies, some embodiments provide a system, a computer-readable storage medium including instructions, and a computer-implemented method for generating replication requests for objects in a distributed storage system. Replication requests for objects in a distributed storage system are generated based at least in part on replication policies for the objects and a current state of the distributed storage system, wherein a respective replication request for a respective object instructs a respective instance of the distributed storage system to replicate the respective object so as to at least partially satisfy a replication policy for the respective object, wherein a respective replication policy includes criteria specifying at least storage device types on which replicas of object are to be stored. At least a subset of the replication requests is then distributed to the respective instances of the distributed storage system for execution.

In some embodiments, prior to distributing at least the subset of the replication requests to the respective instances of the distributed storage system for execution, the replication requests are partitioned into groups of respective replication requests corresponding to respective instances of the distributed storage system at which the respective replication requests are to be performed.

In some embodiments, prior to distributing the at least the subset of the replication requests for each group of respective replication requests to the respective instances of the distributed storage system, priorities of the replication requests are calculated. For each group of replication requests, the replication requests in the group of replication requests are sorted by priority to produce a sorted group of replication requests.

In some embodiments, the priority of a respective replication request is calculated as a difference between a metric corresponding to a benefit of performing the respective replication request and a metric corresponding to a cost of performing the respective replication request.

In some embodiments, prior to distributing a respective subset of replication requests for a respective group of replication requests to a respective instance of the distributed storage system for execution, the respective subset of replication requests for the respective group that can be completed within a predetermined time interval is determined. In some embodiments, replication requests for the respective group of replication requests that are not included in the subset of replication requests for the respective group of replication requests are discarded.

In some embodiments, the predetermined time interval is the time interval between iterations of the generating, the partitioning, and the distributing.

In some embodiments, a respective subset of replication requests for a respective group of replication requests is distributed to a respective instance of the distributed storage system for execution by distributing a respective sorted group of replication requests to the respective instance of the distributed storage system.

In some embodiments, the current state of the distributed storage system includes a current network state, current user quotas for storage space in the distributed storage system, storage space in the distributed storage system that are currently used by users, current storage space available at instances of the distributed storage system, current statuses of replication queues at instances of the distributed storage system, current planned maintenance operations zones, and a list of current replicas of objects in the distributed storage system.

In some embodiments, a replication policy for an object includes criteria selected from the group consisting of, a minimum number of replicas of the object that must be present in the distributed storage system, a maximum number of the replicas of the object that are allowed to be present in the distributed storage system, storage device types on which the replicas of the object are to be stored, locations at which the replicas of the object may be stored, locations at which the replicas of the object may not be stored, and a range of ages for the object during which the replication policy for the object applies.

In some embodiments, the replication requests are background replication requests.

In some embodiments, a respective object is a binary large object (blob).

Some embodiments provide a system, a computer-readable storage medium including instructions, and a computer-implemented method for generating replication requests for objects in a distributed storage system. For each object in a distributed storage system, replication policies for the object that have not been satisfied are determined. Next, the replication requests for the object whose replication policies have not been satisfied are ranked based on a number of replicas of the object that need to be created in order to satisfy the replication policies for the object. Replication requests for the object are generated based at least in part on the replication policies for the object that have not been satisfied, costs and benefits for performing the replication requests, and a current state of the distributed storage system, wherein a respective replication request for a respective object instructs a respective instance of the distributed storage system to replicate the respective object so as to at least partially satisfy a replication policy for the respective object. At least a subset of the replication requests for the objects in the distributed storage system are distributed to respective instances of the distributed storage system corresponding to the replication requests for execution.

In some embodiments, prior to distributing the at least the subset of the replication requests for the objects in the distributed storage system to respective instances of the distributed storage system corresponding to the replication requests for execution, the replication requests are partitioned into groups of respective replication requests corresponding to respective instances of the distributed storage system at which respective predetermined actions of the respective replication requests are to be performed. Priorities of the replication requests are then calculated. For each group of replication requests, the replication requests in the group of replication requests are sorted by priority to produce a sorted group of replication requests.

In some embodiments, a priority of a respective replication request is calculated as a difference between a metric corresponding to a benefit of performing the respective replication request and a metric corresponding to a cost of performing the respective replication request.

In some embodiments, prior to distributing the at least the subset of the replication requests for the objects in the distributed storage system to respective instances of the distributed storage system corresponding to the replication requests for execution, the at least the subset of replication requests that can be completed within a predetermined time interval is determined. In some embodiments, replication requests for the respective group of replication requests that are not included in the subset of replication requests for the respective group of replication requests are discarded.

In some embodiments, replication requests are distributed to a replication queue in a respective instance of the distributed storage system.

Some embodiments provide a system, a computer-readable storage medium including instructions, and a computer-implemented method for simulating a state of a distributed storage system. A current state of a distributed storage system and replication policies for the objects in the distributed storage system is obtained. Proposed modifications to the current state of the distributed storage system are received. The state of the distributed storage system over time is simulated based on the current state of the distributed storage system, the replication policies for the objects in the distributed storage system, and the proposed modifications to the current state of the distributed storage system. Reports relating to the time evolution of the current state of the distributed storage system are generated based on the simulation.

In some embodiments, a respective proposed modification to the current state of the distributed storage system includes information relating to the respective proposed modification to the current state of the distributed storage system and a time at which the respective proposed modification to the current state of the distributed storage system is to occur.

In some embodiments, a respective proposed modification to the current state of the distributed storage system is selected from the group consisting of an addition of storage space in the distributed storage system, a removal of storage space in the distributed storage system, an addition of instances of the distributed storage system, a removal of instances of the distributed storage system, an increase in the amount of data stored in the distributed storage system, a decrease in the amount of data stored in the distributed storage system, a modification to replication policies for objects in the distributed storage system, an addition of network resources in the distributed storage system, and a modification to an algorithm that generates replication requests.

In some embodiments, at least one of the proposed modifications to the current state of the distributed storage system are implemented based on the reports.

Some embodiments provide a system, a computer-readable storage medium including instructions, and a computer-implemented method for generating and distributing replica removal requests for objects in a distributed storage system. Replica removal requests for objects in a distributed storage system are generated based at least in part on replication policies for the objects, wherein a respective replica removal request instructs a respective instance of the distributed storage system to remove a respective replica of the respective object so as to at least partially satisfy replication policies for the respective object. The replica removal requests for the objects in the distributed storage system are then distributed to respective instances of the distributed storage system corresponding to the replica removal requests for execution.

In some embodiments, a replica removal request for a respective object in the distributed storage system is generated based at least in part on replication policies for the respective object as follows. Replication policies for the respective object that have been violated are identified. Next, a replica of the respective object to be removed from an instance of the distributed storage system is selected based at least in part on last access times of replicas of the respective object and the current storage space available at instances of the distributed storage system including the replicas of the respective object. The replica removal request for the replica of the respective object is then generated.

In some embodiments, a replica removal request for the replica of the respective object is generated as follows. It is determined that an instance of the distributed storage system including a replica of the respective object is being deactivated. It is then determined whether the deactivation of the instance of the distributed storage system causes a number of replicas of the respective object to be below a minimum number of replicas of the respective object as specified by the replication policies for the respective object. If the deactivation of the instance of the distributed storage system causes the number of replicas of the respective object to be below the minimum number of replicas of the respective object, a replication request to replicate the respective object is generated based at least in part on replication policies for the respective object and a current state of the distributed storage system. Next, the replication request is distributed to a respective instance of the distributed storage system for execution. The replica removal request for the respective object is generated only after the replication request to replicate the respective object has been completed.

In some embodiments, replica removal requests are generated for an object whose replicas violate replication policies for the object.

In some embodiments, replica removal requests are generated for an object for which dynamic replication requests caused the number of replicas of the object to exceed the number of replicas of the object specified in the replication policies for the object, wherein a dynamic replication request generates a replica of the object based at least in part on a current level of demand for the object.

Some embodiments provide a system, a computer-readable storage medium including instructions, and a computer-implemented method for generating and distributing replica removal requests for objects in a distributed storage system. The following operations are performed for each object in a distributed storage system. One or more replicas of the object to be removed from the distributed storage system are identified based at least in part on replication policies for the object. Next, replica removal requests for the one or more replicas of the object are generated, wherein a respective replica removal request instructs a respective instance of the distributed storage system to remove a respective replica of the respective object so as to at least partially satisfy replication policies for the respective object. The replica removal requests for the object in the distributed storage system are then distributed to respective instances of the distributed storage system corresponding to the replica removal requests for execution.

In some embodiments, the replica removal requests for the one or more replicas of the object are generated as follows. Replication policies for the object that have been violated are identified. Next, the one or more replicas of the object to be removed from instances of the distributed storage system are selected based at least in part on last access times of replicas of the respective object and the current storage space available at the instances of the distributed storage system including the replicas of the respective object. The replica removal requests for the one or more selected replica of the respective object are then generated.

In some embodiments, a replica removal requests for the one or more replicas of the object are generated as follows. It is determined that instance of the distributed storage system including the replica of the object is being deactivated. Next, it is determined whether the deactivation of the instance of the distributed storage system causes a number of replicas of the object to be below a minimum number of replicas of the object as specified by the replication policies for the object. If the deactivation of the instance of the distributed storage system causes the number of replicas of the object to be below the minimum number of replicas of the object, a replication request to replicate the object is generated based at least in part on replication policies for the object and a current state of the distributed storage system. The replication request is then distributed to a respective instance of the distributed storage system for execution. The replica removal request for the object is generated only after the replication request to replicate the object has been completed.

BRIEF DESCRIPTION OF THE DRAWINGS

FIG. 5 illustrates a typical allocation of instance servers to various programs or processes, according to some embodiments.

Like reference numerals refer to corresponding parts throughout the drawings.

DESCRIPTION OF EMBODIMENTS

Before discussing techniques for managing replicas of objects in a distributed storage system, it is instructive to present an exemplary system in which these techniques may be used.

Distributed Storage System Overview

Figure 1A:
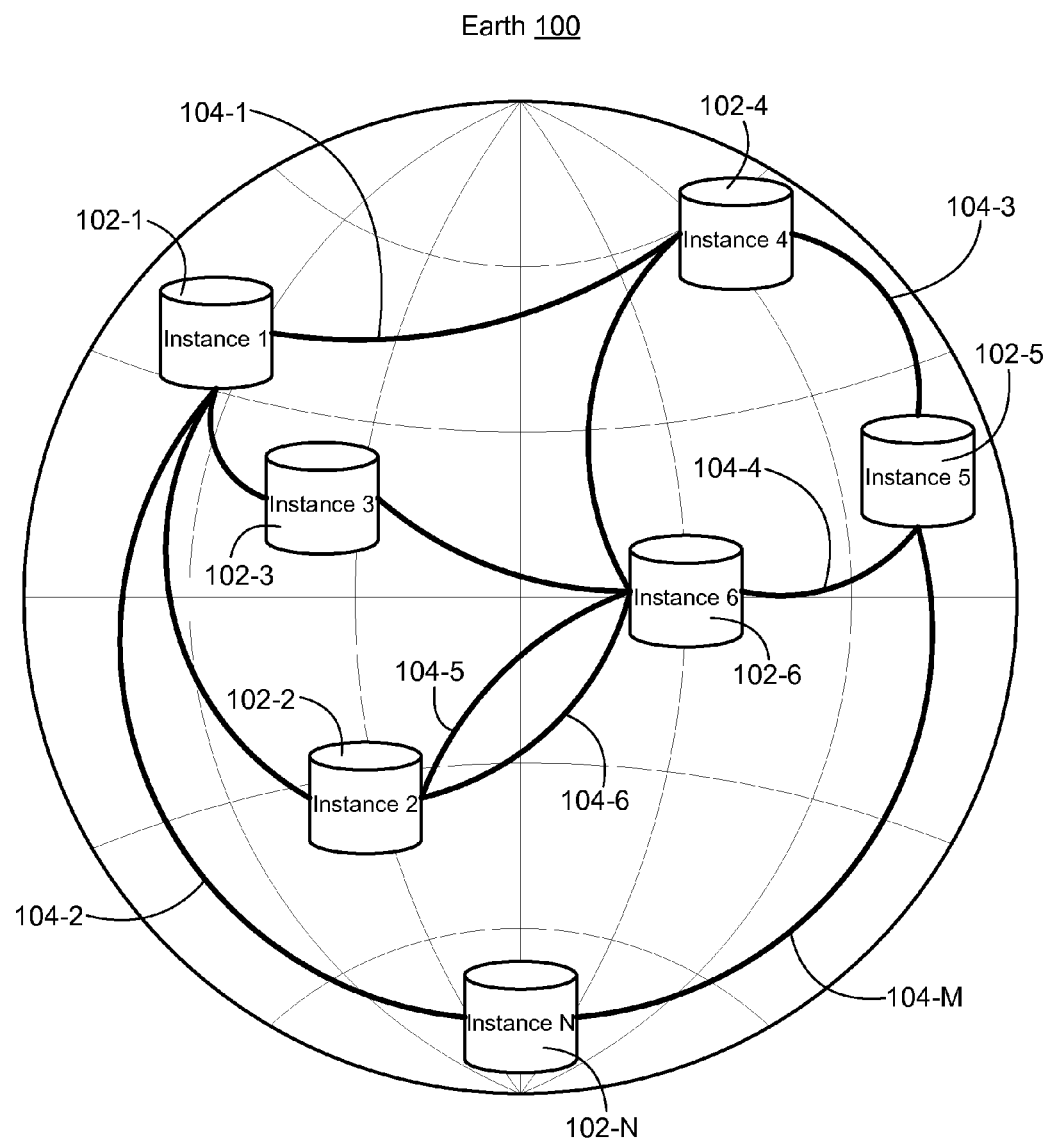
FIG. 1A is a conceptual illustration for placing multiple instances of a database at physical sites all over the globe, according to some embodiments.
Figure 2:
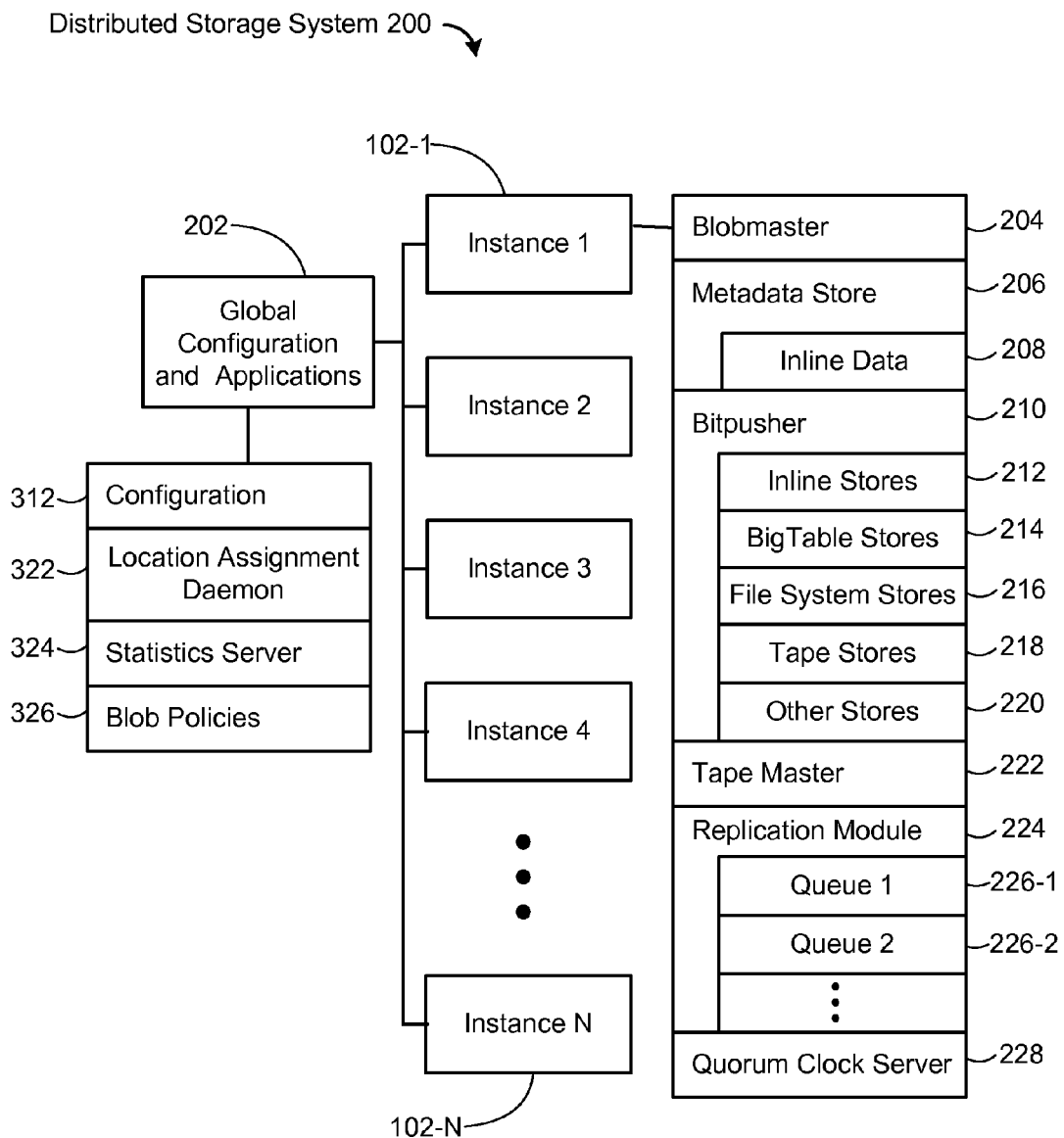
FIG. 2 is a block diagram illustrating multiple instances of a replicated database, with an exemplary set of programs and/or processes shown for the first instance according to some embodiments.
Figure 3:
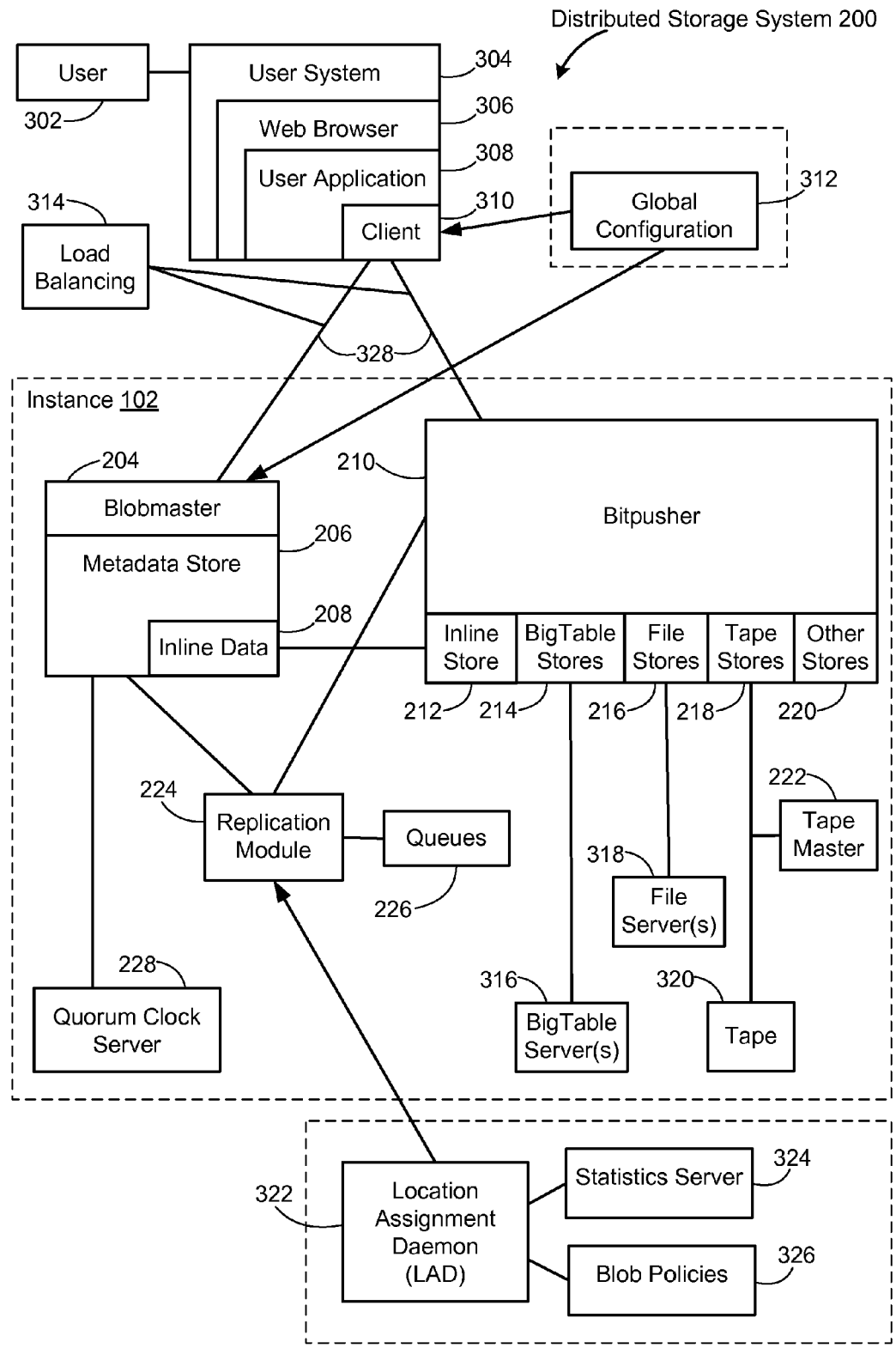
FIG. 3 is a block diagram that illustrates an exemplary instance for the system, and illustrates what blocks within the instance with which a user interacts, according to some embodiments.

The present specification describes a distributed storage system. In some embodiments, as illustrated in FIG. 1A, the distributed storage system is implemented on a global or planet-scale. In these embodiments, there is a plurality of instances 102-1, 102-2, . . . 102-N at various locations on the Earth 100, connected by network communication links 104-1, 104-2, . . . 104-M. In some embodiments, an instance (such as instance 102-1) corresponds to a data center. In other embodiments, multiple instances are physically located at the same data center. Although the conceptual diagram of FIG. 1A shows a limited number of network communication links 104-1, etc., typical embodiments would have many more network communication links. In some embodiments, there are two or more network communication links between the same pair of instances, as illustrated by links 104-5 and 104-6 between instance 2 (102-2) and instance 6 (102-6). In some embodiments, the network communication links are composed of fiber optic cable. In some embodiments, some of the network communication links use wireless technology, such as microwaves. In some embodiments, each network communication link has a specified bandwidth and/or a specified cost for the use of that bandwidth. In some embodiments, statistics are maintained about the transfer of data across one or more of the network communication links, including throughput rate, times of availability, reliability of the links, etc. Each instance typically has data stores and associated databases (as shown in FIGS. 2 and 3), and utilizes a farm of server computers ("instance servers," see FIG. 4) to perform all of the tasks. In some embodiments, there are one or more instances that have limited functionality, such as acting as a repeater for data transmissions between other instances. Limited functionality instances may or may not have any of the data stores depicted in FIGS. 3 and 4.

Figure 1B:
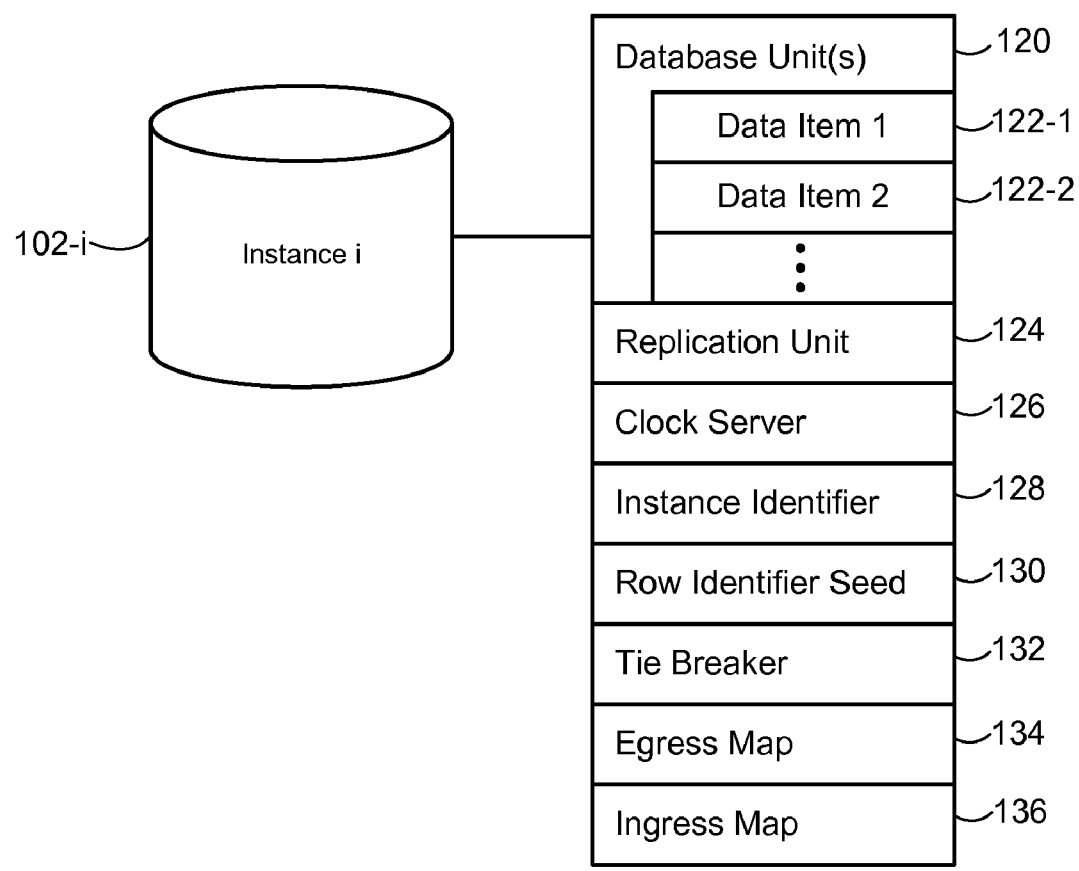
FIG. 1B illustrates basic functionality at each instance according to some embodiments.

FIG. 1B illustrates data and programs at an instance 102-*i* that store and replicate data between instances. The underlying data items 122-1, 122-2, etc. are stored and managed by one or more database units 120. Each instance 102-*i* has a replication unit 124 that replicates data to and from other instances. The replication unit 124 also manages one or more egress maps 134 that track data sent to and acknowledged by other instances. Similarly, the replication unit 124 manages one or more ingress maps, which track data received at the instance from other instances. Egress maps and ingress maps are described in more detail with respect to FIGS. 14A-14D, 15A, and 17 of co-pending U.S. patent application Ser. No. 12/703,167, "Method and System for Efficiently Replicating Data in Non-Relational Databases," filed Feb. 9, 2010, which is incorporated herein by reference in its entirety.

Each instance 102-*i* has one or more clock servers 126 that provide accurate time. In some embodiments, the clock servers 126 provide time as the number of microseconds past a well-defined point in the past. In some embodiments, the clock servers provide time readings that are guaranteed to be monotonically increasing. In some embodiments, each instance server 102-*i* stores an instance identifier 128 that uniquely identifies itself within the distributed storage system. The instance identifier may be saved in any convenient format, such as a 32-bit integer, a 64-bit integer, or a fixed length character string. In some embodiments, the instance identifier is incorporated (directly or indirectly) into other unique identifiers generated at the instance. In some embodiments, an instance 102-*i* stores a row identifier seed 130, which is used when new data items 122 are inserted into the database. A row identifier is used to uniquely identify each data item 122. In some embodiments, the row identifier seed is used to create a row identifier, and simultaneously incremented, so that the next row identifier will be greater. In other embodiments, unique row identifiers are created from a timestamp provided by the clock servers 126, without the use of a row identifier seed. In some embodiments, a tie breaker value 132 is used when generating row identifiers or unique identifiers for data changes (described with respect to FIG. 6-9 of co-pending U.S. patent application Ser. No. 12/703,167, "Method and System for Efficiently Replicating Data in Non-Relational Databases," filed Feb. 9, 2010, which is incorporated herein by reference in its entirety. In some embodiments, a tie breaker 132 is stored permanently in non-volatile memory (such as a magnetic or optical disk).

The elements described in FIG. 1B are incorporated in embodiments of the distributed storage system 200 illustrated in FIGS. 2 and 3. In some embodiments, the functionality described in FIG. 1B is included in a blobmaster 204 and metadata store 206. In these embodiments, the primary data storage (i.e., blobs) is in the data stores 212, 214, 216, 218, and 220, and managed by bitpushers 210. The metadata for the blobs is in the metadata store 206, and managed by the blobmaster 204. The metadata corresponds to the functionality identified in FIG. 1B. Although the metadata for storage of blobs provides an exemplary embodiment of the present invention, one of ordinary skill in the art would recognize that the present invention is not limited to this embodiment.

In some embodiments the disclosed distributed storage system 200, the distributed storage system is used by one or more user applications 308, which are provided by application servers, such as 150-1, 150-2, 150-3, 150-4, and 150-5 illustrated in FIGS. 1C-1G. Exemplary user applications that use embodiments of the disclosed distributed storage system include Gmail, YouTube, Orkut, Google Docs, and Picasa. Some embodiments of the disclosed distributed storage system simultaneously provide storage for multiple distinct user applications, and impose no limit on the number of distinct user applications that can use the distributed storage system. For example, a single implementation of the disclosed distributed storage system may provide storage services for all of the exemplary user applications listed above. In some embodiments, a user application 308 runs in a web browser 306, on a user computer system 304. A user 302 interacts with a user application 308 according to the interface provided by the user application. Each user application 308 uses a client library 310 to store and retrieve data from the distributed storage system 200.

Figure 1C:
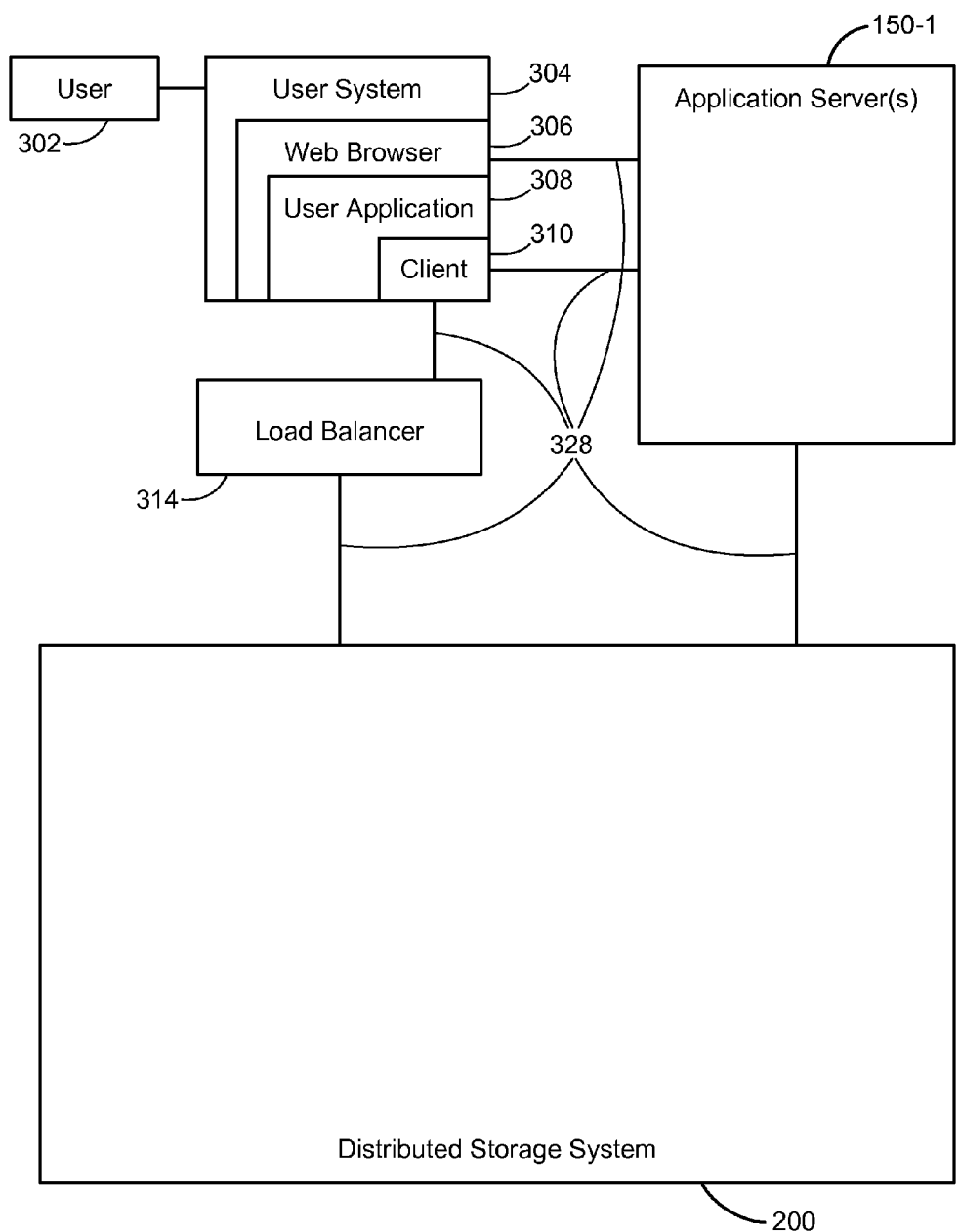
FIGS. 1C-1G illustrate ways that a distributed storage system may be integrated with systems that provide user applications according to some embodiments.

FIG. 1C illustrates an embodiment in which a user application is provided by one or more application servers 150-1. In some embodiments, the web browser 306 downloads user application 308 over a network 328 from the application servers 150-1. In addition to communication between the application server 150-1 and the user system 304, the application server(s) 150-1 communicate over network 328 with the distributed storage system 200. In particular, the application servers may establish storage policies 326 that are applicable to all data stored by the supplied user application. For example, administrators of the Gmail Application servers may establish storage policies 326 that are applicable to millions of user of Gmail.

In some embodiments, communication between the client library 310 and the distributed storage system utilizes a load balancer 314, which can distribute user requests to various instances within the distributed storage system based on various conditions, such as network traffic and usage levels at each instance. In the embodiment illustrated in FIG. 1C, the load balancer 314 is not an integrated component of the distributed storage system 200. The load balancer 314 communicates with both the client library 310 and the distributed storage system 200 over one or more networks 328. The network 328 may include the Internet, one or more local area networks (LANs), one or more wide are networks (WANs), one or more wireless networks (WiFi networks), or various combinations of these.

Figure 1D:
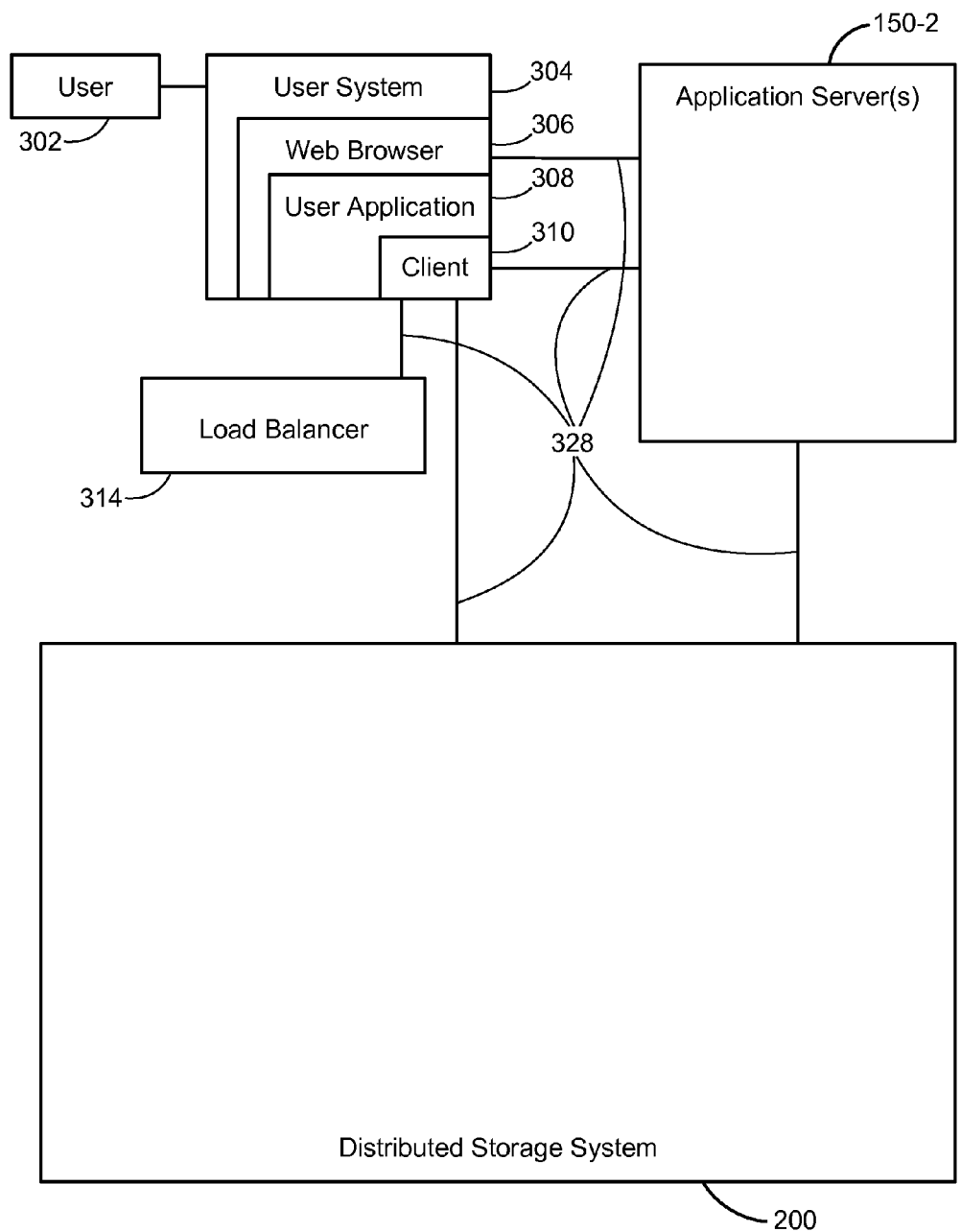

FIG. 1D illustrates an embodiment that is similar to FIG. 1C, except that the load balancing system 314 just returns information to the client library 310 to specify which instance 102 within the distributed storage system 200 should be contacted. The client library 310 then contacts the appropriate instance 102 directly.

Figure 1E:
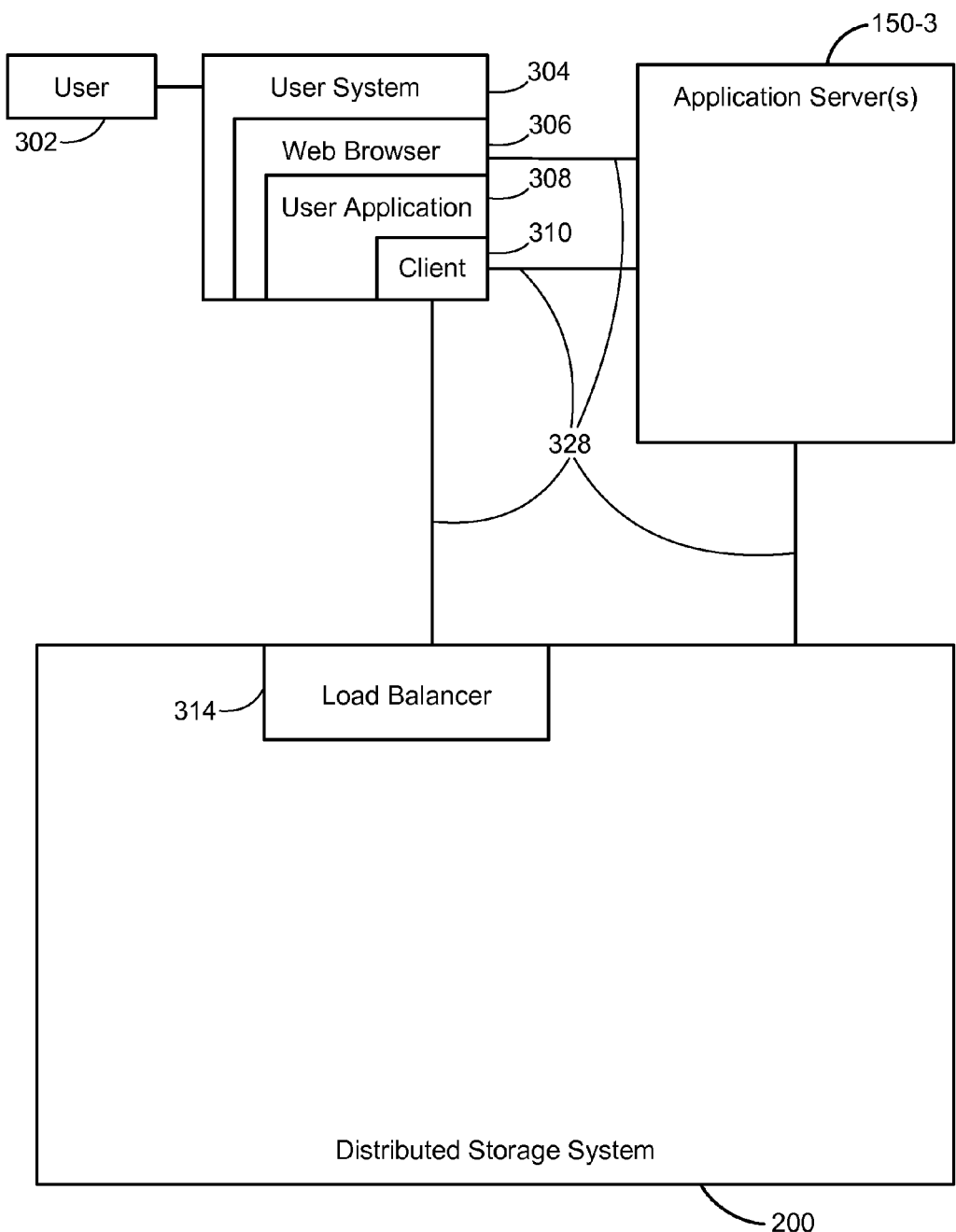

FIG. 1E illustrates an embodiment that is similar to FIG. 1C, except that the load balancing system 314 is an integrated part of the distributed storage application 200. In some embodiments, load balancers 314 are included at some or all of the instances within the distributed storage system 200. Even in these embodiments, a load balancer 314 may direct the communication to a different instance.

Figure 1F:
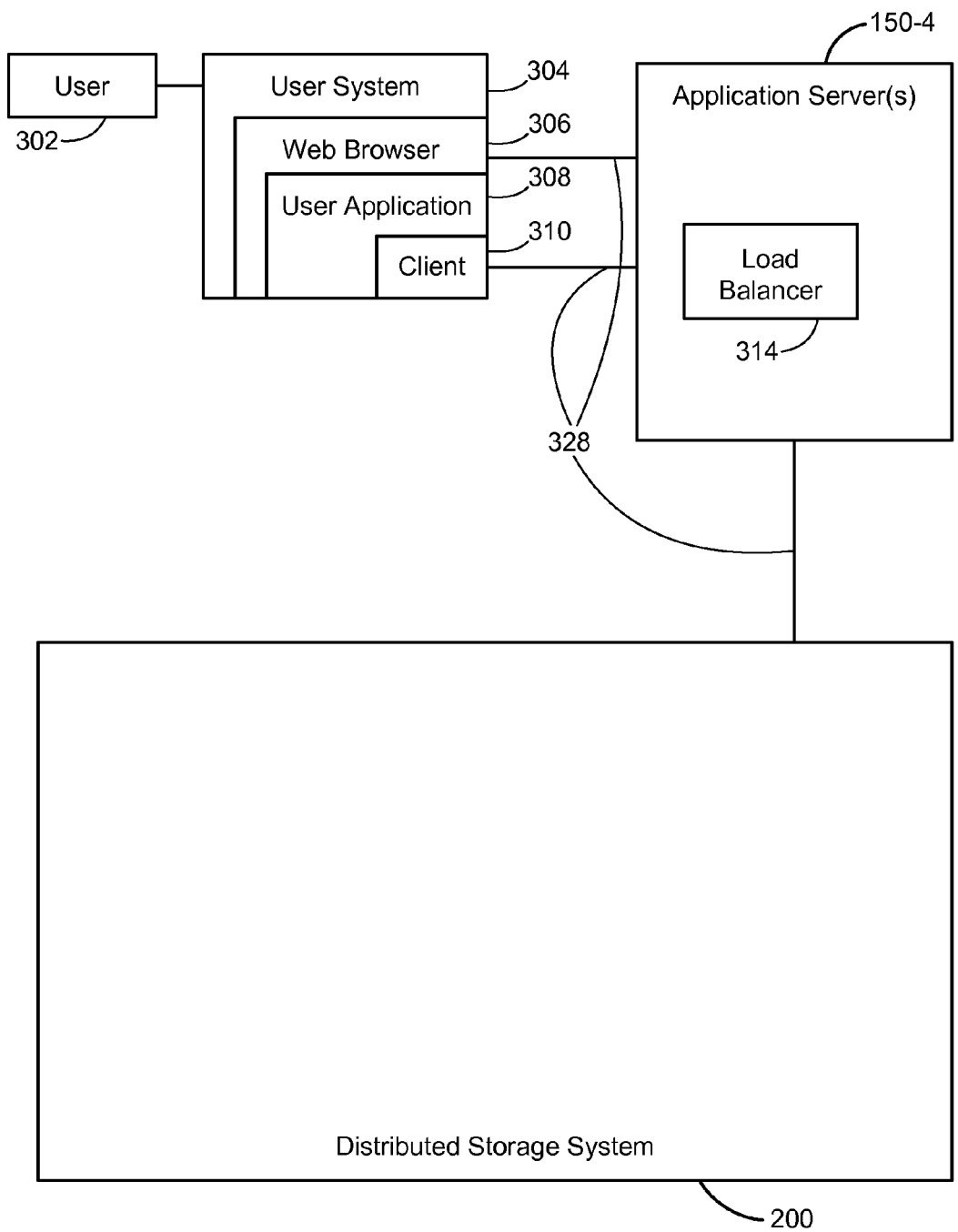

FIG. 1F illustrates an embodiment that is similar to FIG. 1C, except that the load balancing service 314 is included in the application servers 150-4. This embodiment is more commonly used when the distributed storage system 200 is being used by a single user application provided by the application servers 150-4. In this case, the load balancer 314 has a complete picture of the load because the application servers 150-4 receive all of the traffic directed to the distributed storage system.

Figure 1G:
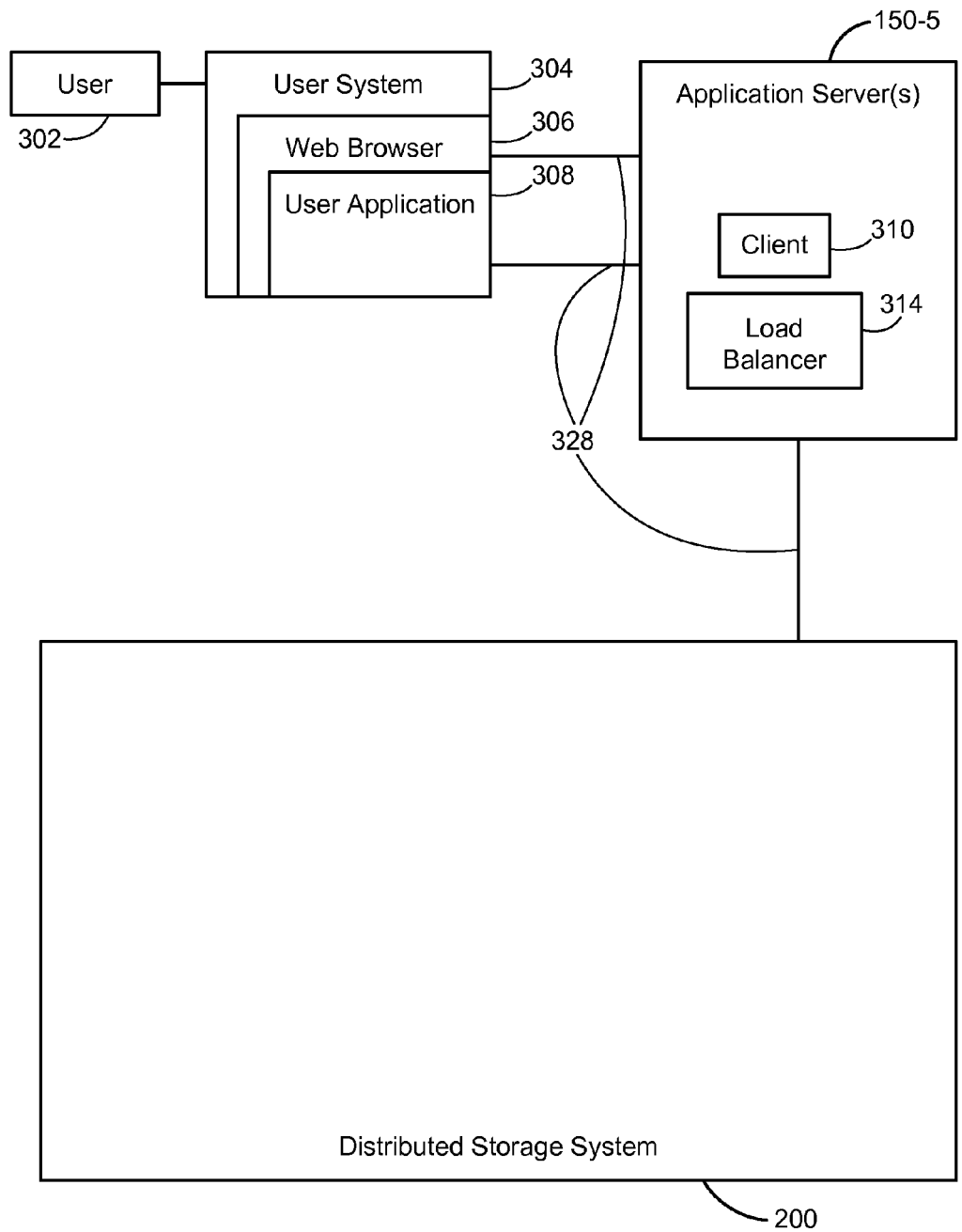

FIG. 1G illustrates a variation of FIG. 1F, in which the client library 310 is maintained at the application servers 150-5 rather than integrated within the running user application 308.

The distributed storage system 200 shown in FIGS. 2 and 3 includes certain global applications and configuration information 202, as well as a plurality of instances 102-1, . . . 102-N. In some embodiments, the global configuration information includes a list of instances and information about each instance. In some embodiments, the information for each instance includes: the set of storage nodes (data stores) at the instance; the state information, which in some embodiments includes whether the metadata at the instance is global or local; and network addresses to reach the blobmaster 204 and bitpusher 210 at the instance. In some embodiments, the global configuration information 202 resides at a single physical location, and that information is retrieved as needed. In other embodiments, copies of the global configuration information 202 are stored at multiple locations. In some embodiments, copies of the global configuration information 202 are stored at some or all of the instances. In some embodiments, the global configuration information can only be modified at a single location, and changes are transferred to other locations by one-way replication. In some embodiments, there are certain global applications, such as the location assignment daemon 346 (see FIG. 3) that can only run at one location at any given time. In some embodiments, the global applications run at a selected instance, but in other embodiments, one or more of the global applications runs on a set of servers distinct from the instances. In some embodiments, the location where a global application is running is specified as part of the global configuration information 202, and is subject to change over time.

FIGS. 2 and 3 illustrate an exemplary set of programs, processes, and data that run or exist at each instance, as well as a user system that may access the distributed storage system 200 and some global applications and configuration. In some embodiments, a user 302 interacts with a user system 304, which may be a computer or other device that can run a web browser 306. A user application 308 runs in the web browser, and uses functionality provided by database client 310 to access data stored in the distributed storage system 200 using network 328. Network 328 may be the Internet, a local area network (LAN), a wide area network (WAN), a wireless network (WiFi), a local intranet, or any combination of these. In some embodiments, a load balancer 314 distributes the workload among the instances, so multiple requests issued by a single client 310 need not all go to the same instance. In some embodiments, database client 310 uses information in a global configuration store 312 to identify an appropriate instance for a request. The client uses information from the global configuration store 312 to find the set of blobmasters 204 and bitpushers 210 that are available, and where to contact them. A blobmaster 204 uses a global configuration store 312 to identify the set of peers for all of the replication processes. A bitpusher 210 uses information in a global configuration store 312 to track which stores it is responsible for. In some embodiments, user application 308 runs on the user system 304 without a web browser 306. Exemplary user applications are an email application and an online video application.

In some embodiments, each instance has a blobmaster 204, which is a program that acts as an external interface to the metadata table 206. For example, an external user application 308 can request metadata corresponding to a specified blob using client 310. Note that a "blob" (i.e., a binary large object) is a collection of binary data (e.g., images, videos, binary files, executable code, etc.) stored as a single entity in a database. This specification uses the terms "blob" and "object" interchangeably and embodiments that refer to a "blob" may also be applied to "objects," and vice versa. In general, the term "object" may refer to a "blob" or any other object such as a database object, a file, or the like, or a portion (or subset) of the aforementioned objects. In some embodiments, every instance 102 has metadata in its metadata table 206 corresponding to every blob stored anywhere in the distributed storage system 200. In other embodiments, the instances come in two varieties: those with global metadata (for every blob in the distributed storage system 200) and those with only local metadata (only for blobs that are stored at the instance). In particular, blobs typically reside at only a small subset of the instances. The metadata table 206 includes information relevant to each of the blobs, such as which instances have copies of a blob, who has access to a blob, and what type of data store is used at each instance to store a blob. The metadata table 206 is described in greater detail in co-pending U.S. patent application Ser. No. 12/703,167, "Method and System for Efficiently Replicating Data in Non-Relational Databases," filed Feb. 9, 2010, which is incorporated herein by reference in its entirety.

When a client 310 wants to read a blob of data, the blobmaster 204 provides one or more read tokens to the client 310, which the client 310 provides to a bitpusher 210 in order to gain access to the relevant blob. When a client 310 writes data, the client 310 writes to a bitpusher 210. The bitpusher 210 returns write tokens indicating that data has been stored, which the client 310 then provides to the blobmaster 204, in order to attach that data to a blob. A client 310 communicates with a bitpusher 210 over network 328, which may be the same network used to communicate with the blobmaster 204. The communication between the client 310 and bitpushers is also subject to load balancing 314. Because of load balancing or other factors, communication with a blobmaster 204 at one instance may be followed by communication with a bitpusher 210 at a different instance. For example, the first instance may be a global instance with metadata for all of the blobs, but may not have a copy of the desired blob. The metadata for the blobs identifies which instances have copies of the desired blob, so the subsequent communication with a bitpusher 210 to read or write is at a different instance.

A bitpusher 210 copies data to and from data stores. In some embodiments, the read and write operations comprise entire blobs. In other embodiments, each blob comprises one or more chunks, and the read and write operations performed by a bitpusher are on solely on chunks. In some of these embodiments, a bitpusher deals only with chunks, and has no knowledge of blobs. In some embodiments, a bitpusher has no knowledge of the contents of the data that is read or written, and does not attempt to interpret the contents. Embodiments of a bitpusher 210 support one or more types of data store. In some embodiments, a bitpusher supports a plurality of data store types, including inline data stores 212, BigTable stores 214, file server stores 216, and tape stores 218. Some embodiments support additional other stores 220, or are designed to accommodate other types of data stores as they become available or technologically feasible.

Inline stores 212 actually use storage space 208 in the metadata store 206. Inline stores provide faster access to the data, but have limited capacity, so inline stores are generally for relatively "small" blobs. In some embodiments, inline stores are limited to blobs that are stored as a single chunk. In some embodiments, "small" means blobs that are less than 32 kilobytes. In some embodiments, "small" means blobs that are less than 1 megabyte. As storage technology facilitates greater storage capacity, even blobs that are currently considered large may be "relatively small" compared to other blobs.

BigTable stores 214 store data in BigTables located on one or more BigTable database servers 316. BigTables are described in several publicly available publications, including "Bigtable: A Distributed Storage System for Structured Data," Fay Chang et al, OSDI 2006, which is incorporated herein by reference in its entirety. In some embodiments, the BigTable stores save data on a large array of servers 316.

File stores 216 store data on one or more file servers 318. In some embodiments, the file servers use file systems provided by computer operating systems, such as UNIX. In other embodiments, the file servers 318 implement a proprietary file system, such as the Google File System (GFS). GFS is described in multiple publicly available publications, including "The Google File System," Sanjay Ghemawat et al., SOSP'03, Oct. 19-22, 2003, which is incorporated herein by reference in its entirety. In other embodiments, the file servers 318 implement NFS (Network File System) or other publicly available file systems not implemented by a computer operating system. In some embodiments, the file system is distributed across many individual servers 318 to reduce risk of loss or unavailability of any individual computer.

Tape stores 218 store data on physical tapes 320. Unlike a tape backup, the tapes here are another form of storage. The tape stores 218 are described in greater detail in co-pending U.S. Provisional Patent Application No. 61/302,909, filed Feb. 9, 2010. subsequently filed as U.S. patent application Ser. No. 13/023,498, filed Feb. 8, 2011, "Method and System for Providing Efficient Access to a Tape Storage System," which is incorporated herein by reference in its entirety. In some embodiments, a Tape Master application 222 assists in reading and writing from tape. In some embodiments, there are two types of tape: those that are physically loaded in a tape device, so that the tapes can be robotically loaded; and those tapes that physically located in a vault or other offline location, and require human action to mount the tapes on a tape device. In some instances, the tapes in the latter category are referred to as deep storage or archived. In some embodiments, a large read/write buffer is used to manage reading and writing data to tape. In some embodiments, this buffer is managed by the tape master application 222. In some embodiments there are separate read buffers and write buffers. In some embodiments, a client 310 cannot directly read or write to a copy of data that is stored on tape. In these embodiments, a client must read a copy of the data from an alternative data source, even if the data must be transmitted over a greater distance.

In some embodiments, there are additional other stores 220 that store data in other formats or using other devices or technology. In some embodiments, bitpushers 210 are designed to accommodate additional storage technologies as they become available.

Each of the data store types has specific characteristics that make them useful for certain purposes. For example, inline stores provide fast access, but use up more expensive limited space. As another example, tape storage is very inexpensive, and provides secure long-term storage, but a client cannot directly read or write to tape. In some embodiments, data is automatically stored in specific data store types based on matching the characteristics of the data to the characteristics of the data stores. In some embodiments, users 302 who create files may specify the type of data store to use. In other embodiments, the type of data store to use is determined by the user application 308 that creates the blobs of data. In some embodiments, a combination of the above selection criteria is used. In some embodiments, each blob is assigned to a storage policy 326, and the storage policy specifies storage properties. A blob policy 326 may specify the number of copies of the blob to save, in what types of data stores the blob should be saved, locations where the copies should be saved, etc. For example, a policy may specify that there should be two copies on disk (Big Table stores or File Stores), one copy on tape, and all three copies at distinct metro locations. In some embodiments, blob policies 326 are stored as part of the global configuration and applications 202.

In some embodiments, each instance 102 has a quorum clock server 228, which comprises one or more servers with internal clocks. The order of events, including metadata deltas 608, is important, so maintenance of a consistent time clock is important. A quorum clock server regularly polls a plurality of independent clocks, and determines if they are reasonably consistent. If the clocks become inconsistent and it is unclear how to resolve the inconsistency, human intervention may be required. The resolution of an inconsistency may depend on the number of clocks used for the quorum and the nature of the inconsistency. For example, if there are five clocks, and only one is inconsistent with the other four, then the consensus of the four is almost certainly right. However, if each of the five clocks has a time that differs significantly from the others, there would be no clear resolution. It is important to note that even if the quorum clock server 228 determines that the independent clocks are consistent with each other (or with a subset of each other), the independent clocks may still be unreliable. For example, it is possible the independent clocks are skewed in the same direction (e.g., skewed to the future or past). Thus, calculating time intervals using times reported by the quorum clock server 228 may still produce incorrect behavior. The embodiments described below may be used to determine time intervals between two times reported by an unreliable clock (e.g., the clock generated by the quorum clock server 228). Techniques for determining time intervals between two times reported by an unreliable clock are described in greater detail in co-pending U.S. Provisional Patent Application Ser. No. 61/302,894, filed Feb. 9, 2010, subsequently filed as U.S. patent application Ser. No. 13/022,551, filed Feb. 7, 2011, "System and Method for Determining the Age of Objects in the Presence of Unreliable Clocks," which is incorporated herein by reference in its entirety.

In some embodiments, each instance has a replication module 224, which identifies blobs or chunks that will be replicated to other instances. In some embodiments, the replication module 224 may use one or more replication queues 226-1, 226-2, . . . . Items to be replicated are placed in a replication queue 226, and the items are replicated when resources are available. In some embodiments, items in a replication queue 226 have assigned priorities, and the highest priority items are replicated as bandwidth becomes available. There are multiple ways that items can be added to a replication queue 226. In some embodiments, items are added to replication queues 226 when blob or chunk data is created or modified. For example, if an end user 302 modifies a blob at instance 1, then the modification needs to be transmitted to all other instances that have copies of the blob. In embodiments that have priorities in the replication queues 226, replication items based on blob content changes have a relatively high priority. In some embodiments, items are added to the replication queues 226 based on a current user request for a blob that is located at a distant instance. For example, if a user in California requests a blob that exists only at an instance in India, an item may be inserted into a replication queue 226 to copy the blob from the instance in India to a local instance in California. That is, since the data has to be copied from the distant location anyway, it may be useful to save the data at a local instance. These dynamic replication requests receive the highest priority because they are responding to current user requests. The dynamic replication process is described in more detail in co-pending U.S. Provisional Patent Application No. 61/302,896, filed Feb. 9, 2010, subsequently filed as U.S. patent application Ser. No. 13/022,579, filed Feb. 7, 2011, "Method and System for Dynamically Replicating Data within a Distributed Storage System," which is incorporated herein by reference in its entirety.

In some embodiments, a background replication process creates and deletes copies of blobs based on blob policies 326 and blob access data provided by a statistics server 324. The blob policies specify how many copies of a blob are desired, where the copies should reside, and in what types of data stores the data should be saved. In some embodiments, a policy may specify additional properties, such as the number of generations of a blob to save, or time frames for saving different numbers of copies. E.g., save three copies for the first 30 days after creation, then two copies thereafter. Using blob policies 326, together with statistical information provided by the statistics server 324, a location assignment daemon 322 determines where to create new copies of a blob and what copies may be deleted. When new copies are to be created, records are inserted into a replication queue 226. In some embodiments, the location assignment daemon 322 manages replicas of objects globally for the distributed storage system 200. In other words, there is only one location assignment daemon 322 in the distributed storage system 200. The use of blob policies 326 and the operation of a location assignment daemon 322 are described in more detail below. The replication queues 226 are described in more detail in co-pending patent U.S. Provisional Patent Application No. 61/302,908, filed Feb. 9, 2010, subsequently filed as U.S. patent application Ser. No. 13/022,564, filed Feb. 7, 2011, "System and Method for Replicating Objects in a Distributed Storage System," which is incorporated herein by reference in its entirety.

Figure 4:
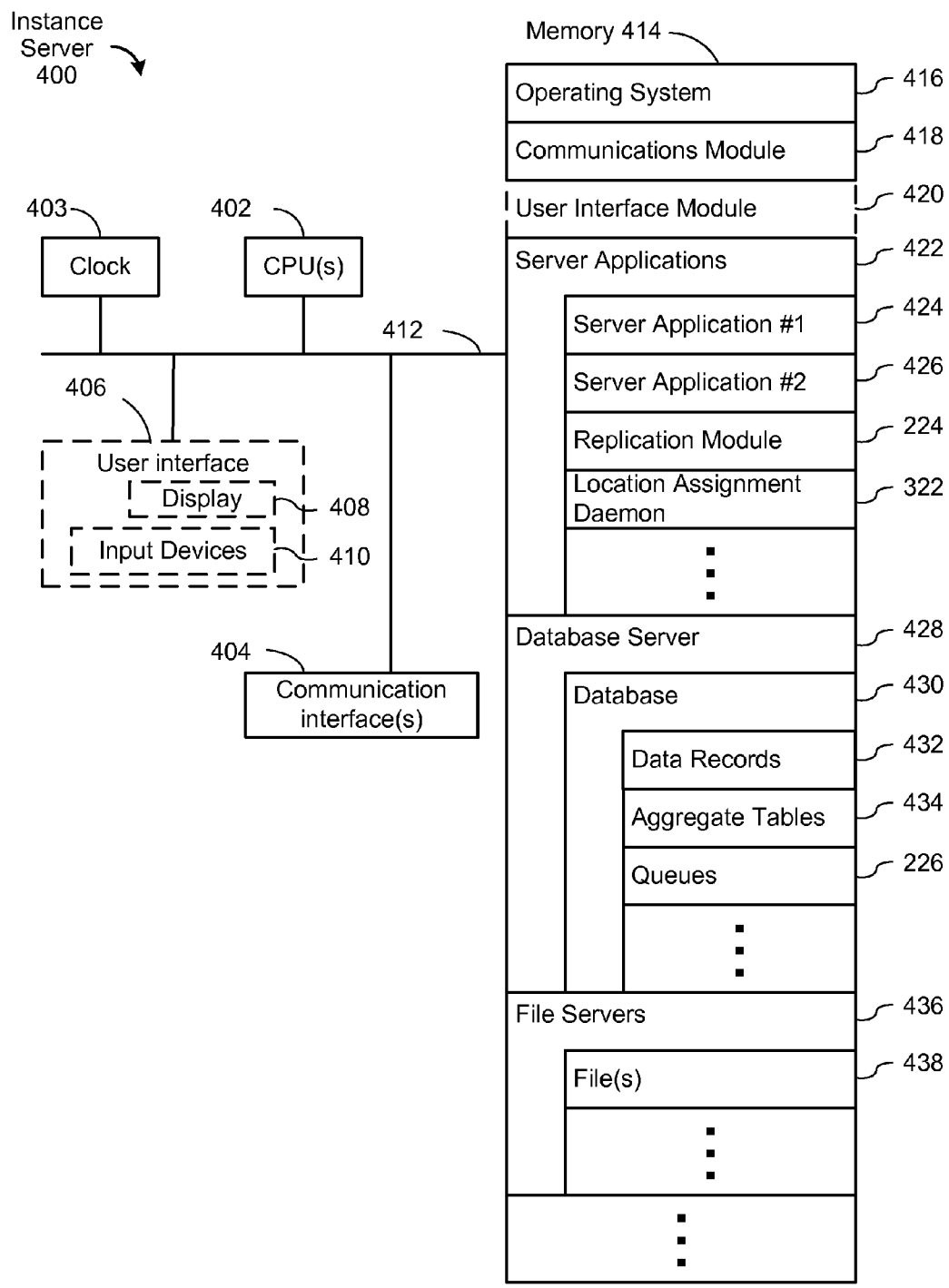
FIG. 4 is a block diagram of an instance server that may be used for the various programs and processes, according to some embodiments.

FIG. 4 is a block diagram illustrating an Instance Server 400 used for operations identified in FIGS. 2 and 3 in accordance with some embodiments of the present invention. An Instance Server 400 typically includes one or more processing units (CPU's) 402 for executing modules, a clock 403 that reports the current date and/or time, programs and/or instructions stored in memory 414 and thereby performing processing operations, one or more network or other communications interfaces 404, memory 414, and one or more communication buses 412 for interconnecting these components. In some embodiments, the clock 403 is a local clock that is periodically synchronized with a clock server (e.g., a quorum clock server 228 or any other clock server on a network, etc.). In some embodiments, an Instance Server 400 includes a user interface 406 comprising a display device 408 and one or more input devices 410. In some embodiments, memory 414 includes high-speed random access memory, such as DRAM, SRAM, DDR RAM or other random access solid state memory devices. In some embodiments, memory 414 includes non-volatile memory, such as one or more magnetic disk storage devices, optical disk storage devices, flash memory devices, or other non-volatile solid state storage devices. In some embodiments, memory 414 includes one or more storage devices remotely located from the CPU(s) 402. Memory 414, or alternately the non-volatile memory device(s) within memory 414, comprises a computer readable storage medium. In some embodiments, memory 414 or the computer readable storage medium of memory 414 stores the following programs, modules and data structures, or a subset thereof:

- an operating system 416 that includes procedures for handling various basic system services and for performing hardware dependent tasks;
- a communications module 418 that is used for connecting an Instance Server 400 to other Instance Servers or computers via the one or more communication network interfaces 404 (wired or wireless) and one or more communication networks 328, such as the Internet, other wide area networks, local area networks, metropolitan area networks, and so on;
- an optional user interface module 420 that receives commands from the user via the input devices 410 and generates user interface objects in the display device 408;
- one or more server applications 422, such as a blobmaster 204 that provides an external interface to the blob metadata; a bitpusher 210 that provides access to read and write data from data stores; a replication module 224 that copies data from one instance to another; a quorum clock server 228 that provides a stable clock; a location assignment daemon 322 that determines where copies of a blob should be located; and other server functionality as illustrated in FIGS. 2 and 3. As illustrated, two or more server applications 424 and 426 may execute on the same physical computer; and
- one or more database servers 428 that provides storage and access to one or more databases 430. The databases 430 may provide storage for metadata 206, replication queues 226, blob policies 326, global configuration 312, the statistics used by statistics server 324, as well as ancillary databases used by any of the other functionality. Each database 430 has one or more tables with data records 432. In some embodiments, some databases include aggregate tables 434, such as the statistics used by statistics server 324;
- one or more file servers 436 that provide access to read and write files, such as files 438. File server functionality may be provided directly by an operating system (e.g., UNIX or Linux), or by a software application, such as the Google File System (GFS).

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 414 may store a subset of the modules and data structures identified above. Furthermore, memory 414 may store additional modules or data structures not described above.

Although FIG. 4 shows an instance server used for performing various operations or storing data as illustrated in FIGS. 2 and 3, FIG. 4 is intended more as functional description of the various features which may be present in a set of one or more computers rather than as a structural schematic of the embodiments described herein. In practice, and as recognized by those of ordinary skill in the art, items shown separately could be combined and some items could be separated. For example, some items shown separately in FIG. 4 could be implemented on individual computer systems and single items could be implemented by one or more computer systems. The actual number of computers used to implement each of the operations, databases, or file storage systems, and how features are allocated among them will vary from one implementation to another, and may depend in part on the amount of data at each instance, the amount of data traffic that an instance must handle during peak usage periods, as well as the amount of data traffic that an instance must handle during average usage periods. Furthermore, for embodiments in which the location assignment daemon 322 manages replicas of objects globally for the distributed storage system 200, the location assignment daemon 322 is located on a computer system that is separate and distinct from the instance servers. The components of the computer system that includes the location assignment daemon 322 are similar to the instance server 400 with the exception that computer system may omit the server applications 424 and 426, the replication module 224, the database server 428, the file servers 436, and any combination thereof. In some embodiments, each instance of the distributed storage system 200 includes a stripped-down version of the location assignment daemon 322. The stripped-down version of the location assignment daemon 322 is used by a particular instance of the distributed storage system 200 when a new object is created. These embodiments are described in more detail below.

To provide faster responses to clients and to provide fault tolerance, each program or process that runs at an instance is generally distributed among multiple computers. The number of instance servers 400 assigned to each of the programs or processes can vary, and depends on the workload. FIG. 5 provides exemplary information about a typical number of instance servers 400 that are assigned to each of the functions. In some embodiments, each instance has about 10 instance servers performing (502) as blobmasters. In some embodiments, each instance has about 100 instance servers performing (504) as bitpushers. In some embodiments, each instance has about 50 instance servers performing (506) as BigTable servers. In some embodiments, each instance has about 1000 instance servers performing (508) as file system servers. File system servers store data for file system stores 216 as well as the underlying storage medium for BigTable stores 214. In some embodiments, each instance has about 10 instance servers performing (510) as tape servers. In some embodiments, each instance has about 5 instance servers performing (512) as tape masters. In some embodiments, each instance has about 10 instance servers performing (514) replication management, which includes both dynamic and background replication. In some embodiments, each instance has about 5 instance servers performing (516) as quorum clock servers.

Life of an Object

Figure 6A:
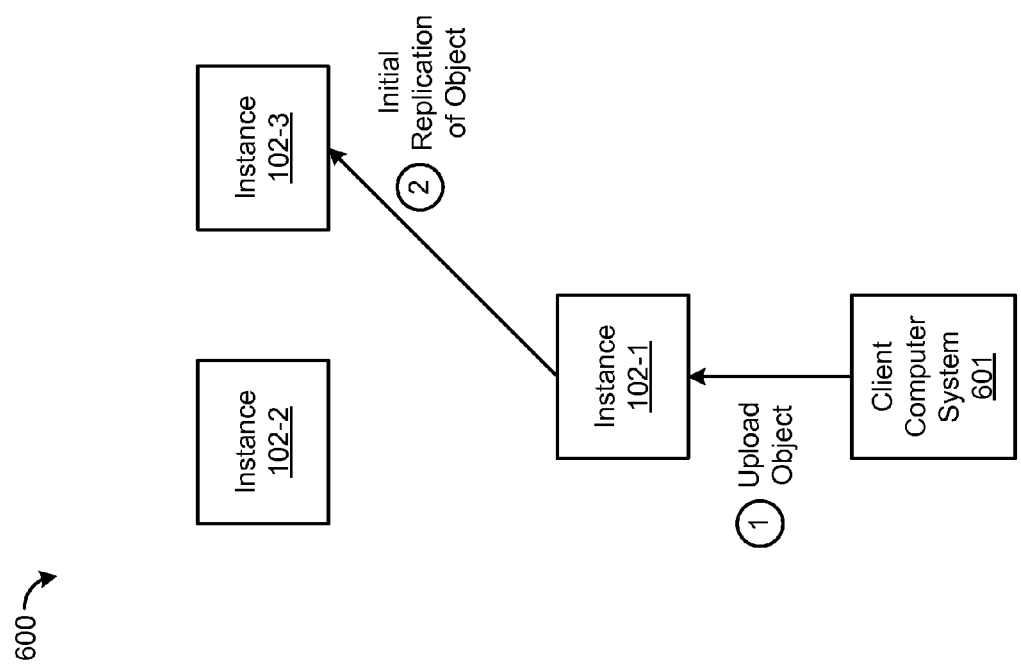
FIG. 6A is a block diagram illustrating the creation and the initial replication of an object, according to some embodiments.
Figure 6B:
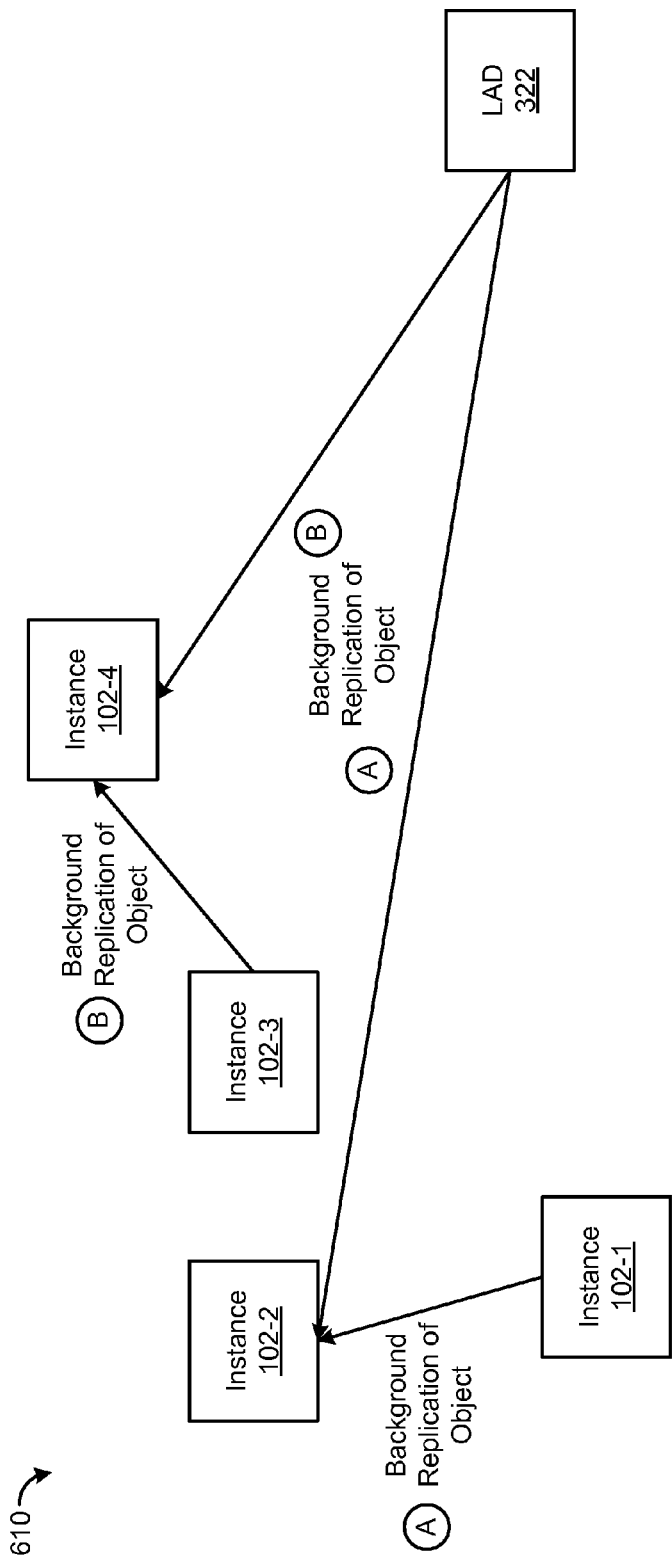
FIG. 6B is a block diagram illustrating the background replication of the object, according to some embodiments.

FIGS. 6A-6D present block diagrams 600, 610, 620, and 630 illustrating an exemplary sequence of events in the life of an exemplary object in the distributed storage system 200, according to some embodiments. In FIG. 6A, a client computer system 601 uploads (1) an object to instance 102-1 of the distributed storage system 200. In order to ensure data integrity, an initial replication of the object (2) is performed. In this example, a replica of the object is created in instance 102-3 of the distributed storage system 200.

Some time later, the location assignment daemon 322 initiates background replication (A, B) of the object based on replication policies for the object. The location assignment daemon 322 generates a replication request based on the policies for the object. The replication policies specify, among other things, a minimum and/or a maximum number of replicas of the object to be maintained in the distributed storage system 200. The replication request for the object includes a priority that is used when inserting the replication request into a replication queue 226 (i.e., a priority queue). In this example, replicas of the object are stored in instances 102-2 and 102-4 of the distributed storage system. The location assignment daemon 322 is described in more detail below.

Figure 6C:
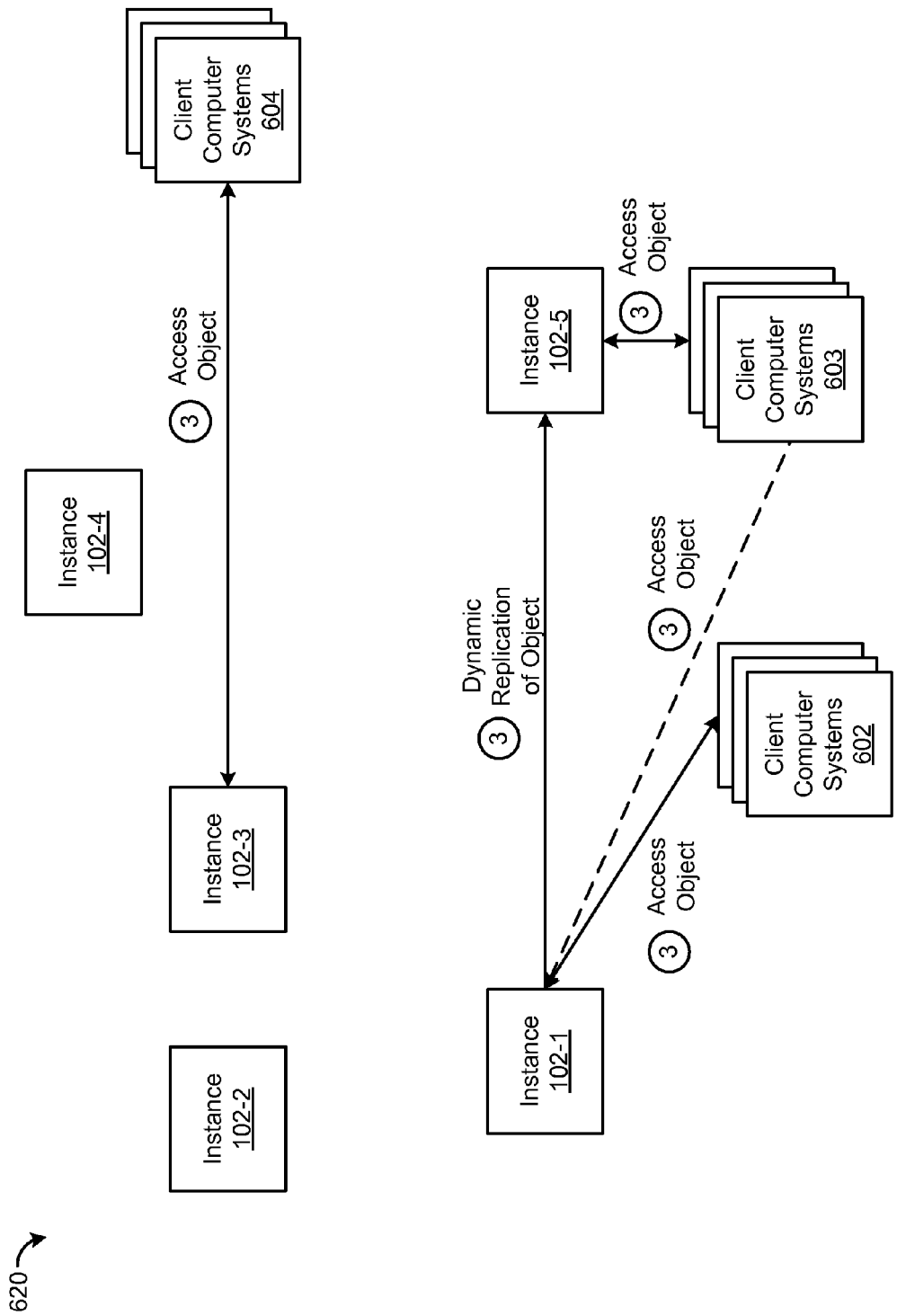
FIG. 6C is a block diagram illustrating a dynamic replication of the object, according to some embodiments.

At some point in time (either before or after the events illustrated in FIG. 6B), the object experiences a large demand. For example, client computer systems 602, 603, and 604 may request (3) access to the object. If the demand for the object exceeds the current capacity of a particular instance of the distributed storage system, a dynamic replication of the object (3) is performed in which a replica of the object is created in one or more instances. In this example, a replica of the object is created in instance 102-5 of the distributed storage system. A subset of the requests for the object are then redirected to the instance 102-5 as illustrated in FIG. 6C. Note that a dynamic replication of the object may also be performed to reduce the network latency between the client computer systems attempting to access the object and the instance at which the object is located. For example, if the replicas of the object are initially located in instances of the distributed storage system 200 within the United States, but there is a large demand for the object from Japan, replicas of the object may be created in instances of the distributed storage system 200 that located are within Japan.

Figure 6D:
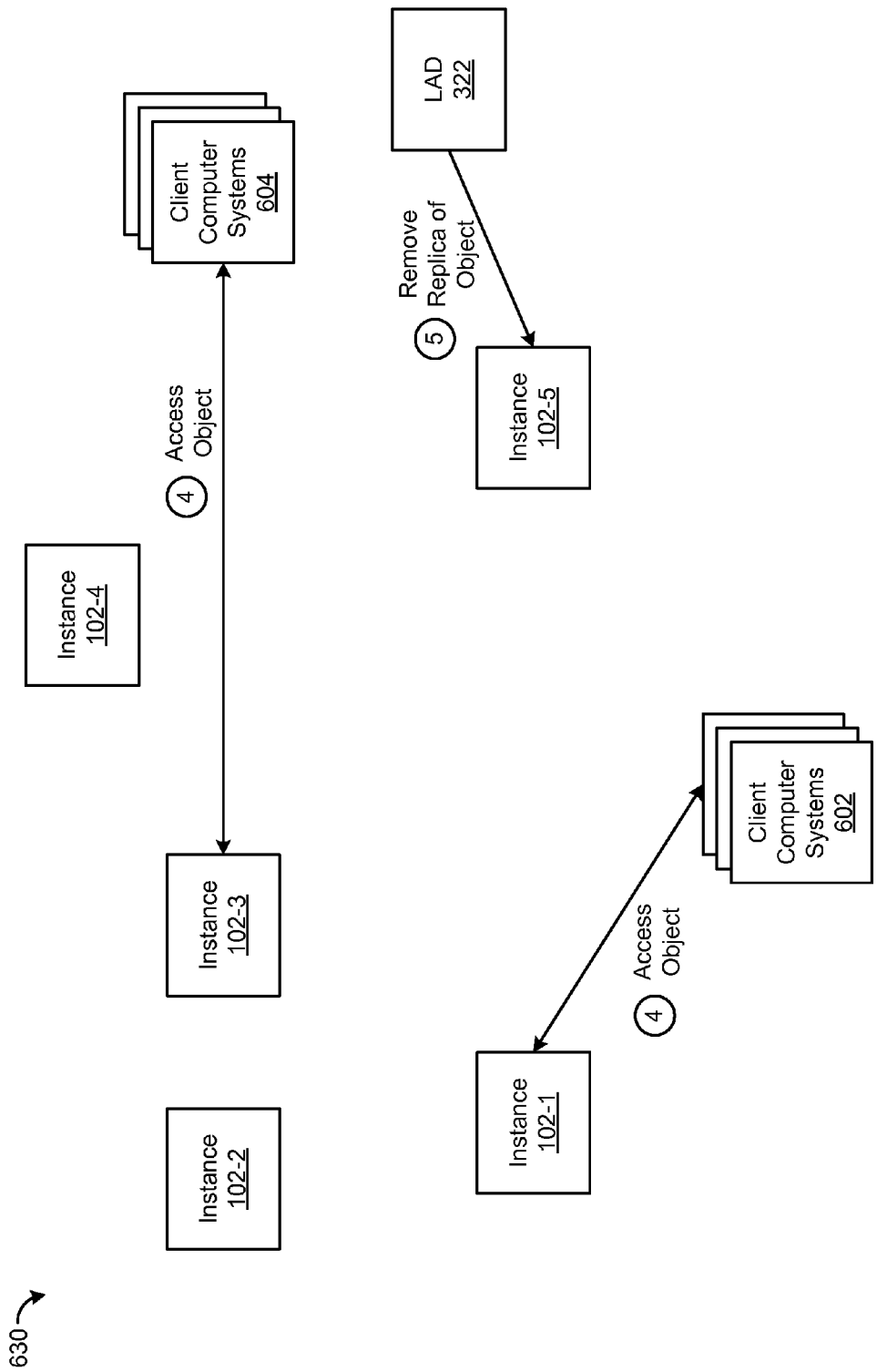
FIG. 6D is a block diagram illustrating the removal of a replica of the object, according to some embodiments.

Dynamic replication requests may increase the number of replicas of the object beyond a number allowed by the replication policies for the object. When the demand of an object decreases (e.g., only client computer systems 602 and 604 are still requesting the object), replicas of the object that exceed the replication policies for the object may be removed. In these cases, the location assignment daemon 322 removes (5) the extra replicas of the object when it has been determined that the extra replicas of the object are no longer needed (e.g., demand for the object has decreased), as illustrated in FIG. 6D.

Location Assignment Daemon and Replication Policies

In some embodiments, a single location assignment daemon 322 globally manages replicas of objects across all instances of the distributed storage system 200. In these embodiments, in order to satisfy replication policies of the objects in the distributed storage system 200, the location assignment daemon 322 generates replication requests that add replicas of objects and/or replica removal requests that delete replicas of objects in the distributed storage system 200.

In some embodiments, the location assignment daemon 322 generates replication requests and replica removal requests based on a cost-benefit analysis. For example, a benefit is obtained when a replica of an object whose number of replicas is below the minimum number of replicas specified in the replication policy for the object is added to the distributed storage system 200. The cost of adding a replica of an object is a storage cost, network bandwidth usage, and transaction costs (e.g., processing required by a source instance and destination instance). Similarly, a benefit is obtained when replica of an object whose number of replicas is exceeds the maximum number of replicas specified in the replication policy for the object is removed from the distributed storage system 200.

In some embodiments, the location assignment daemon 322 determines whether a replica for an object at a particular instance can be deleted. In these embodiments, the replica of the object at the instance is removed only when (1) the removal of the replica of the object does not put the number of replicas of the object below the minimum number of replicas for the object as specified in the replication policies for the object and (2) a last access time of the replica for the object at the instance is greater than a predetermined threshold. Note that the predetermined threshold may be defined by the distributed storage system, the user (i.e., application), and/or the amount of free storage space at the instance.

In some embodiments, the location assignment daemon 322 moves replicas of objects from one instance of the distributed storage system 200 to another instance of the distributed storage system 200. Again, the location assignment daemon 322 performs a cost-benefit analysis of moving the replicas of the objects, as described above.

In some embodiments, a replication policy for an object includes criteria selected from the group consisting of a minimum number of replicas of the object that must be present in the distributed storage system, a maximum number of the replicas of the object that are allowed to be present in the distributed storage system, storage device types on which the replicas of the object are to be stored, locations at which the replicas of the object may be stored, locations at which the replicas of the object may not be stored, and a range of ages for the object during which the replication policy for the object applies. For example, a first replication policy for a webmail application may specify that each object in the webmail application must have a minimum of 2 replicas and a maximum of 5 replicas, wherein the replicas of the objects can be stored in data centers outside of China, and wherein at least 1 replica of each object must be stored on tape. A second replication policy for the webmail application may also specify that for objects older than 30 days, a minimum of 1 replica and a maximum of 3 replicas are stored in the distributed storage system 200, wherein the replicas of the objects can be stored in data centers outside of China, and wherein at least 1 replica of each object must be stored on tape.

In some embodiments, the location assignment daemon 322 continuously scans through the metadata for all objects (e.g., the metadata may be stored in a global metadata table) in the distributed storage system 200 and generates replication requests or replica removal requests to attempt to satisfy the replication policies for the objects.

In some embodiments, the location assignment daemon 322 periodically scans through the metadata for all objects (e.g., the metadata may be stored in a global metadata table) in the distributed storage system 200 and generates replication requests or replica removal requests to attempt to satisfy the replication policies for the objects. The period between successive runs of the location assignment daemon 322 may be determined in part on the number of objects in the distributed storage system 200 and/or the number of servers available to scan through the metadata for the objects in the distributed storage system 200. In some embodiments, the order in which the location assignment daemon 322 scans the metadata for the objects in the distributed storage system 200 is varied between successive iterations. For example, in a first iteration, the location assignment daemon 322 may scan the metadata for the objects in sequential order in a metadata table. In a second iteration, the location assignment daemon 322 may scan the metadata for the objects in reverse sequential order in a metadata table. In other iterations, the location assignment daemon 322 may scan the metadata for the objects in a random order or an order based on a mathematical function.

In some embodiments, when a new object is created, a stripped-down version of the location assignment daemon 322 (also referred to as "micro-LAD") is executed by the instance in which the new object was created. The micro-LAD generates high-priority replication requests to replicate the newly-created object. These high-priority replication requests ensure that the newly-created object has sufficient replicas for backup and redundancy purposes (e.g., to guard against loss of access to instances of the distributed storage system 200).

Figure 7:
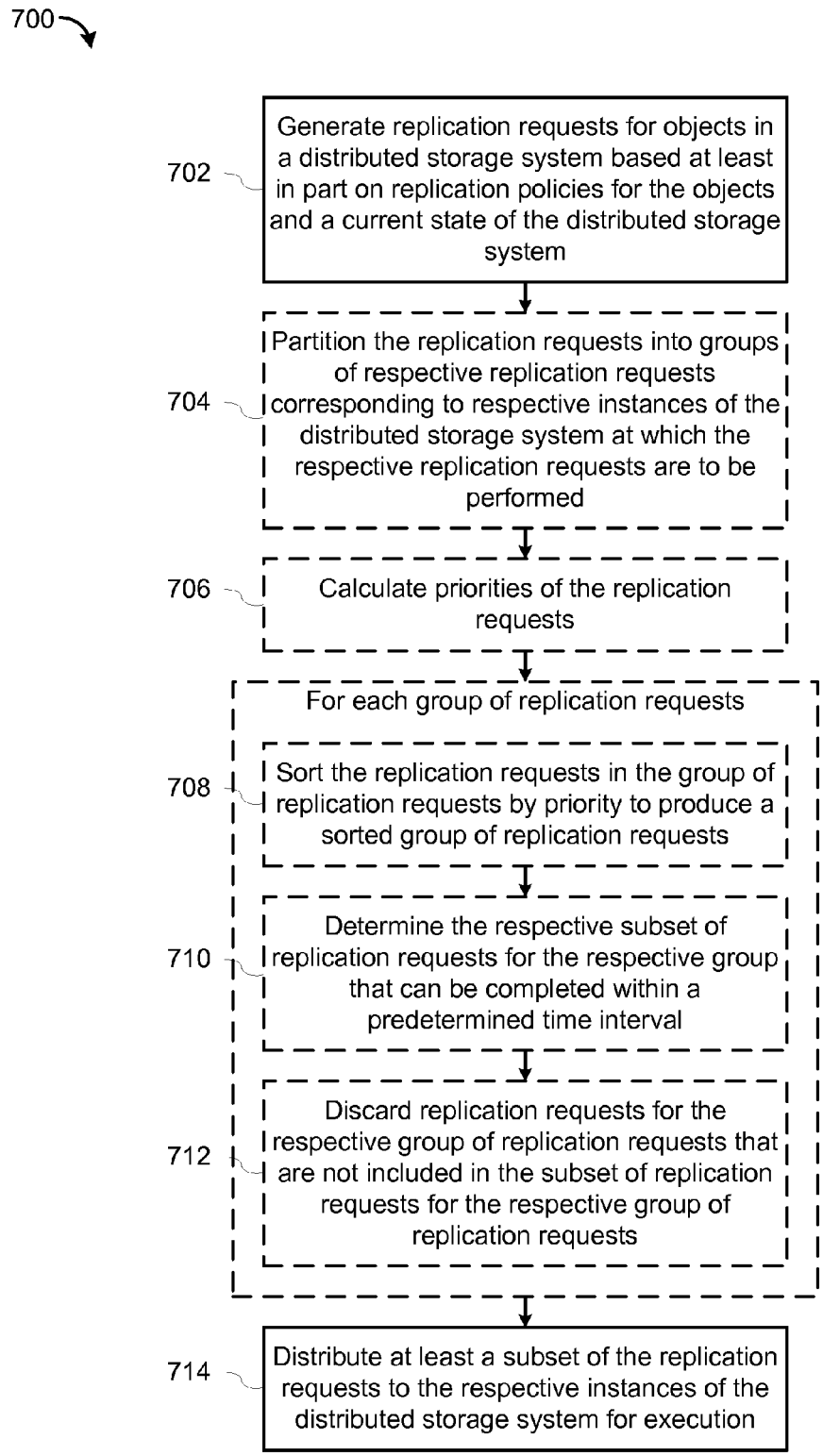
FIG. 7 is a flowchart of a method for generating replication requests for objects in a distributed storage system, according to some embodiments.
Figure 8:
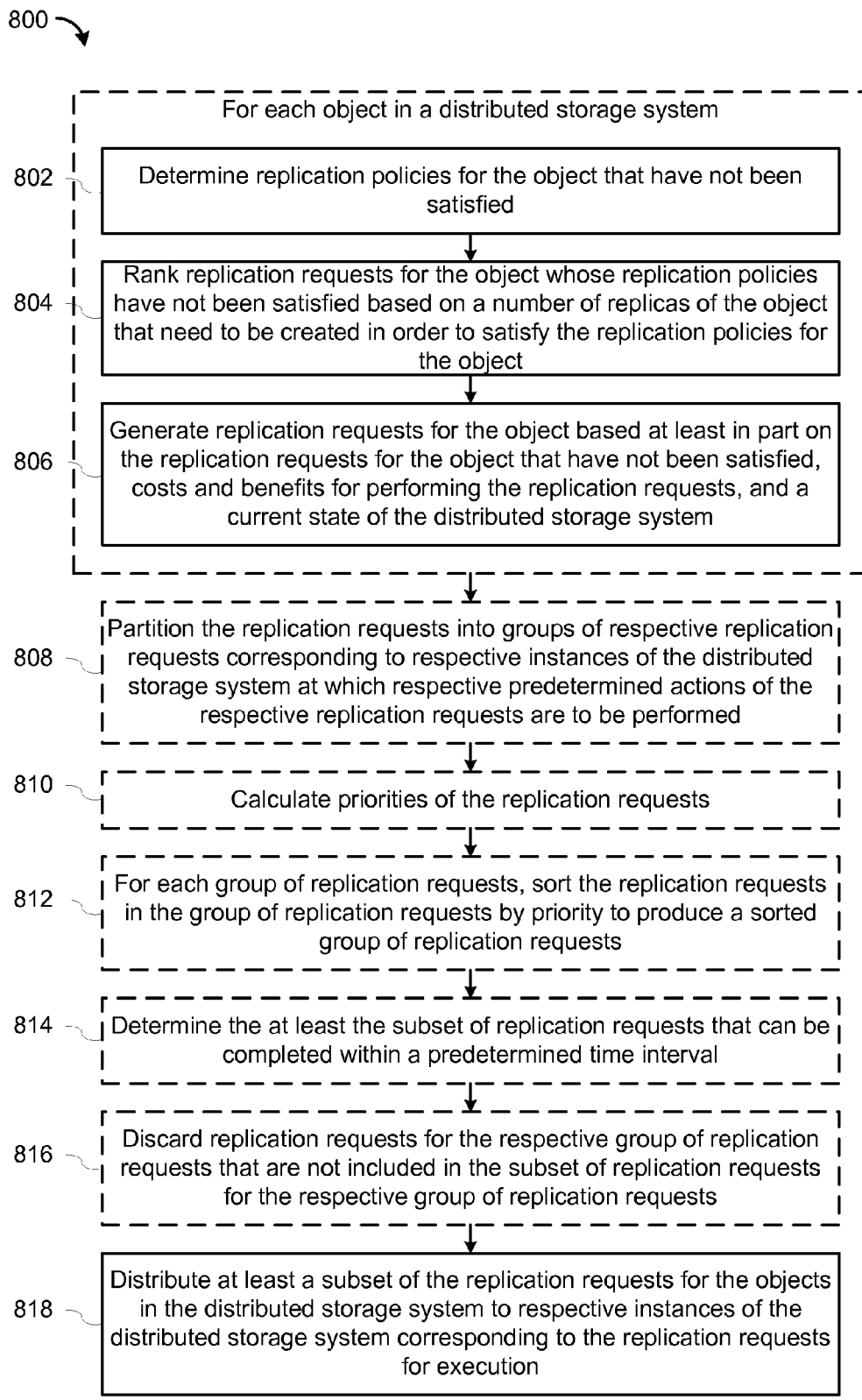
FIG. 8 is a flowchart of another method for generating and distributing replication requests for objects in a distributed storage system, according to some embodiments.

The process of managing replicas of objects is described in more detail with respect to FIGS. 7-14 below. FIGS. 7-8 discuss embodiments for generating replication requests for replicating objects in the distributed storage system 200 and FIGS. 9-14 discuss embodiments for removing replicas of objects from the distributed storage system 200.

Generating Replication Requests

FIG. 7 is a flowchart of a method 700 for generating replication requests for objects in a distributed storage system, according to some embodiments. The location assignment daemon 322 generates (702) replication requests for objects in a distributed storage system based at least in part on replication policies for the objects and a current state of the distributed storage system, wherein a respective replication request for a respective object instructs a respective instance of the distributed storage system to replicate the respective object so as to at least partially satisfy a replication policy for the respective object, wherein a respective replication policy includes criteria specifying at least storage device types on which replicas of object are to be stored.

In some embodiments, the current state of the distributed storage system includes a current network state, current user quotas for storage space in the distributed storage system, storage space in the distributed storage system that are currently used by users, current storage space available at each instance of the distributed storage system, current statuses of replication queues at each instance of the distributed storage system, current planned maintenance operations zones (e.g., groups of instances of the distributed storage system that are shut down for maintenance at the same time), and a list of current replicas of objects in the distributed storage system.

In some embodiments, the replication requests are background replication requests.

In some embodiments, a respective object is a binary large object (blob).

In some embodiments, the location assignment daemon 322 partitions (704) the replication requests into groups of respective replication requests corresponding to respective instances of the distributed storage system at which the respective replication requests are to be performed.

In some embodiments, location assignment daemon 322 calculates (706) priorities of the replication requests. In some embodiments, the location assignment daemon 322 calculates (706) the priority of the respective replication request as a difference between a metric corresponding to a benefit of performing the respective replication request and a metric corresponding to a cost of performing the respective replication request. For each group of replication requests, the location assignment daemon 322 then sorts (708) the replication requests in the group of replication requests by priority to produce a sorted group of replication requests.

In some embodiments, for each group of replication requests, the location assignment daemon 322 determines (710) the respective subset of replication requests for the respective group that can be completed within a predetermined time interval. In some embodiments, the predetermined time interval is the time interval between iterations of the generating, the partitioning, and the distributing.

In some embodiments, the location assignment daemon 322 discards (712) replication requests for the respective group of replication requests that are not included in the subset of replication requests for the respective group of replication requests (e.g., the subset of replication requests for the respective group that can be completed within a predetermined time interval).

The location assignment daemon 322 distributes (714) at least a subset of the replication requests to the respective instances of the distributed storage system for execution. In some embodiments, the location assignment daemon 322 distributes (714) a respective subset of replication requests for a respective group of replication requests to a respective instance of the distributed storage system for execution by distributing a respective sorted group of replication requests to the respective instance of the distributed storage system.

FIG. 8 is a flowchart of another method 800 for generating and distributing replication requests for objects in a distributed storage system, according to some embodiments. The location assignment daemon 322 performs following operations for each object in a distributed storage system. The location assignment daemon 322 determines (802) replication policies for the object that have not been satisfied. Next, the location assignment daemon 322 ranks (804) replication requests for the object whose replication policies have not been satisfied based on a number of replicas of the object that need to be created in order to satisfy the replication policies for the object. The location assignment daemon 322 then generates (806) replication requests for the object based at least in part on the replication policies for the object that have not been satisfied, costs and benefits for performing the replication requests, and a current state of the distributed storage system, wherein a respective replication request for a respective object instructs a respective instance of the distributed storage system to replicate the respective object so as to at least partially satisfy a replication policy for the respective object; and In some embodiments, the location assignment daemon 322 partitions (808) the replication requests into groups of respective replication requests corresponding to respective instances of the distributed storage system at which respective predetermined actions of the respective replication requests are to be performed. The location assignment daemon 322 then calculates (810) priorities of the replication requests. In some embodiments, the location assignment daemon 322 calculates (810) a priority of a respective replication request by calculating the priority of the respective replication request as a difference between a metric corresponding to a benefit of performing the respective replication request and a metric corresponding to a cost of performing the respective replication request. For each group of replication requests, the location assignment daemon 322 sorts (812) the replication requests in the group of replication requests by priority to produce a sorted group of replication requests.

In some embodiments, the location assignment daemon 322 determines (814) the at least the subset of replication requests that can be completed within a predetermined time interval.

In some embodiments, the location assignment daemon 322 discards (816) replication requests for the respective group of replication requests that are not included in the subset of replication requests for the respective group of replication requests.

The location assignment daemon 322 then distributes (818) at least a subset of the replication requests for the objects in the distributed storage system to respective instances of the distributed storage system corresponding to the replication requests for execution.

In some embodiments, replication requests are distributed to a replication queue in a respective instance of the distributed storage system.

Removing Replicas of Objects

As discussed above, a dynamic replication process may create more replicas of an object to meet a current demand for the object. However, the number of replicas of the object may be more than the replication policies for the object allow. Thus, some embodiments provide a mechanism for removing replicas of objects from the distributed storage system 200 so that the replicas of the object conform to the replication policies of the object.

Figure 9:
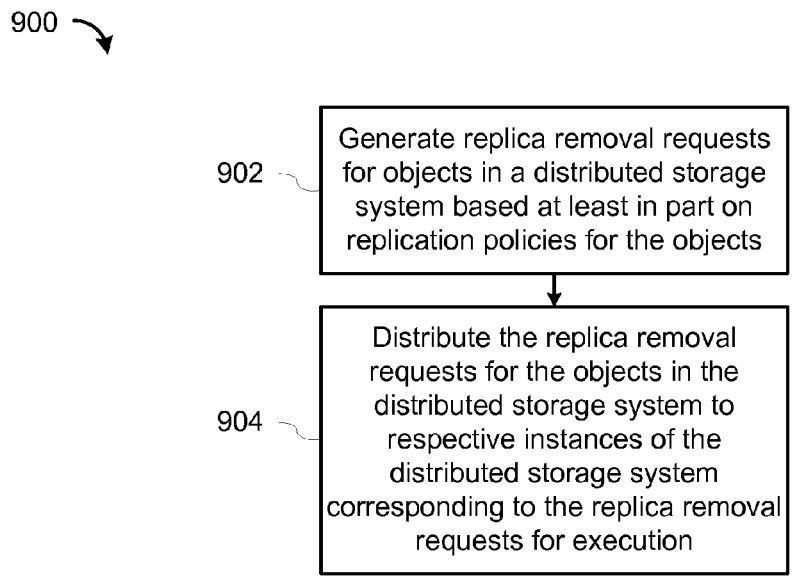
FIG. 9 is a flowchart of a method for generating replica removal requests for objects in a distributed storage system, according to some embodiments.

FIG. 9 is a flowchart of a method 900 for generating replica removal requests for objects in a distributed storage system, according to some embodiments. The location assignment daemon 322 generates (902) replica removal requests for objects in a distributed storage system based at least in part on replication policies for the objects, wherein a respective replica removal request instructs a respective instance of the distributed storage system to remove a respective replica of the respective object so as to at least partially satisfy replication policies for the respective object. In some embodiments, replica removal requests are generated for an object whose replicas violate replication policies for the object. In some embodiments, replica removal requests are generated for an object for which dynamic replication requests caused the number of replicas of the object to exceed the number of replicas of the object specified in the replication policies for the object, wherein a dynamic replication request generates a replica of the object based at least in part on a current level of demand for the object.

Figure 10:
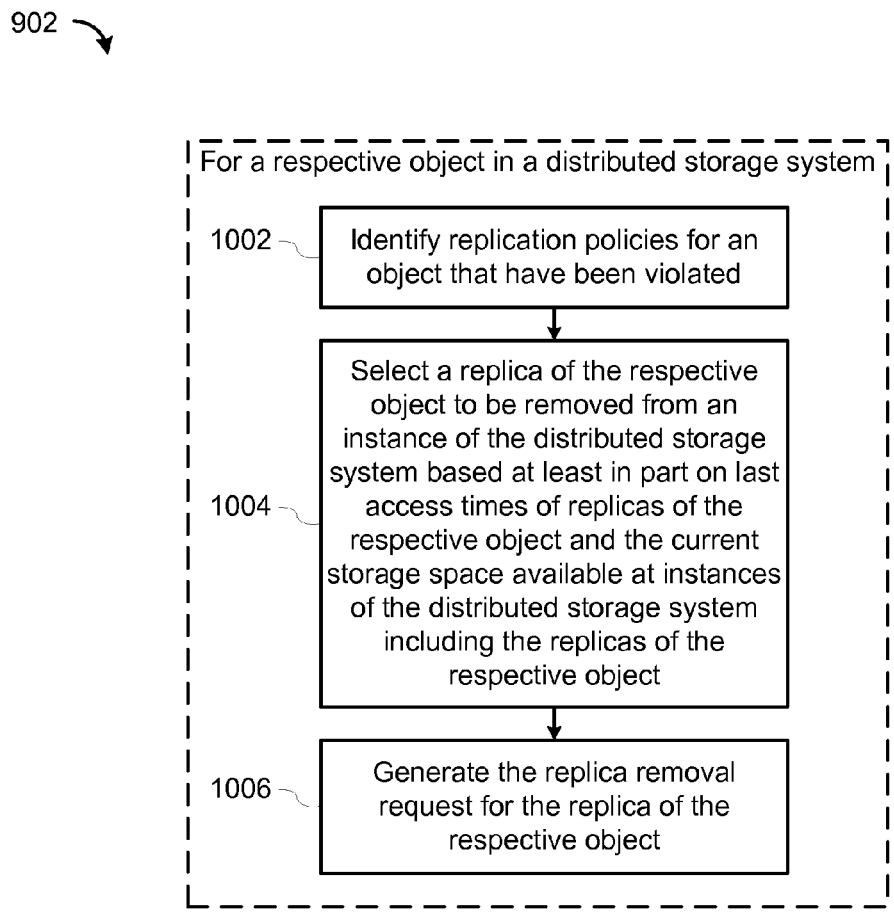
FIG. 10 is a flowchart of a method for generating a replica removal request for an object in the distributed storage system, according to some embodiments.

Attention is now directed to FIG. 10, which is a flowchart of a method for generating (902) a replica removal request for a respective object in the distributed storage system, according to some embodiments. The location assignment daemon 322 identifies (1002) replication policies for the respective object that have been violated. Next, the location assignment daemon 322 selects (1004) a replica of the respective object to be removed from an instance of the distributed storage system based at least in part on last access times of replicas of the respective object and the current storage space available at instances of the distributed storage system including the replicas of the respective object. The location assignment daemon 322 then generates (1006) the replica removal request for the replica of the respective object.

Figure 11:
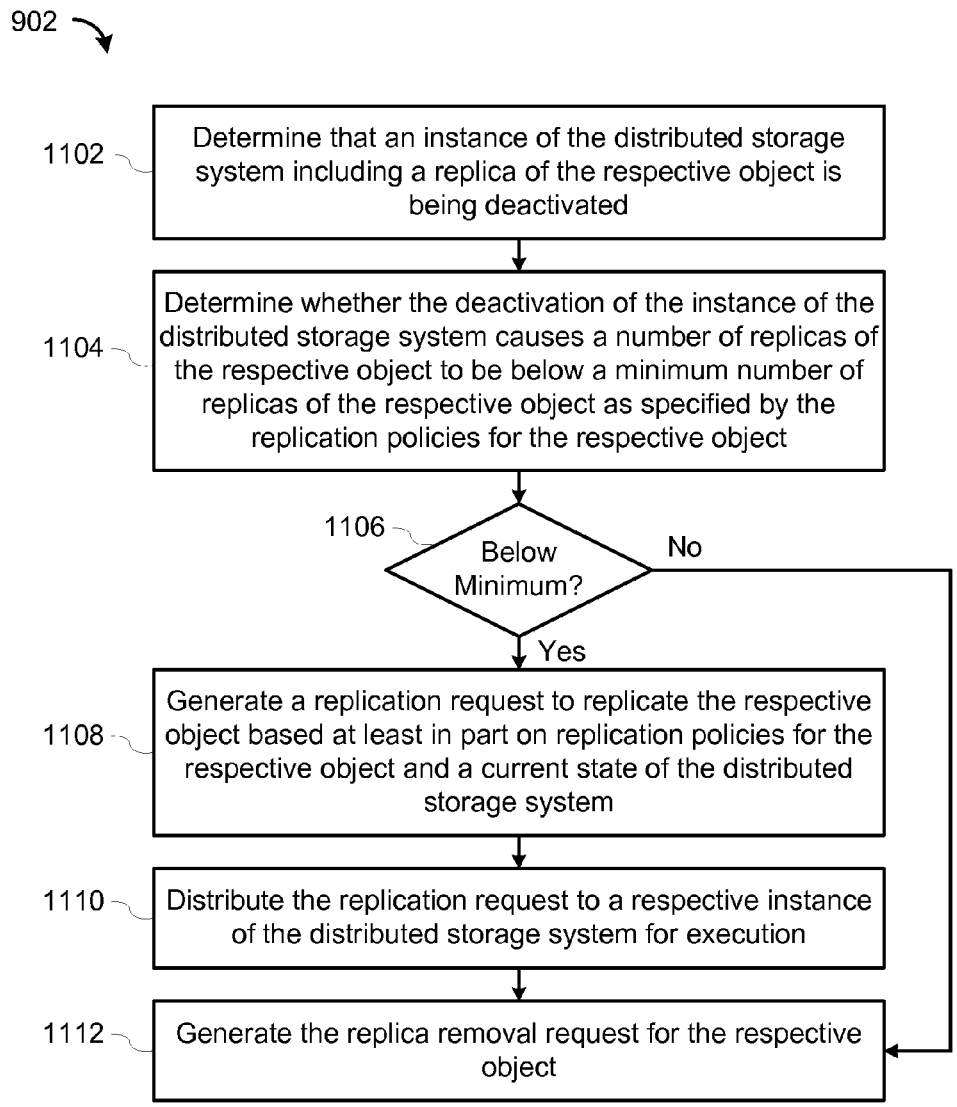
FIG. 11 is a flowchart of another method for generating a replica removal request for an object in the distributed storage system, according to some embodiments.

FIG. 11 is a flowchart of another method for generating (902) a replica removal request for an object in the distributed storage system, according to some embodiments. The location assignment daemon 322 determines (1102) that an instance of the distributed storage system including a replica of the respective object is being deactivated. The location assignment daemon 322 then determines (1104) whether the deactivation of the instance of the distributed storage system causes a number of replicas of the respective object to be below a minimum number of replicas of the respective object as specified by the replication policies for the respective object.

The location assignment daemon 322 generates (1108) a replication request to replicate the respective object based at least in part on replication policies for the respective object and a current state of the distributed storage system. Next, the location assignment daemon 322 distributes (1110) the replication request to a respective instance of the distributed storage system for execution. The location assignment daemon 322 then generates (1112) the replica removal request for the respective object only after the replication request to replicate the respective object has been completed.

If the deactivation of the instance of the distributed storage system does not causes the number of replicas of the respective object to be below the minimum number of replicas of the respective object (1106, no), the location assignment daemon 322 generates the replica removal request for the respective object.

In some embodiments, the replica removal request is handled by the blobmaster 204 of an instance that includes the replica that is to be removed.

Returning to FIG. 9, the location assignment daemon 322 then distributes (904) the replica removal requests for the objects in the distributed storage system to respective instances of the distributed storage system corresponding to the replica removal requests for execution.

Figure 12:
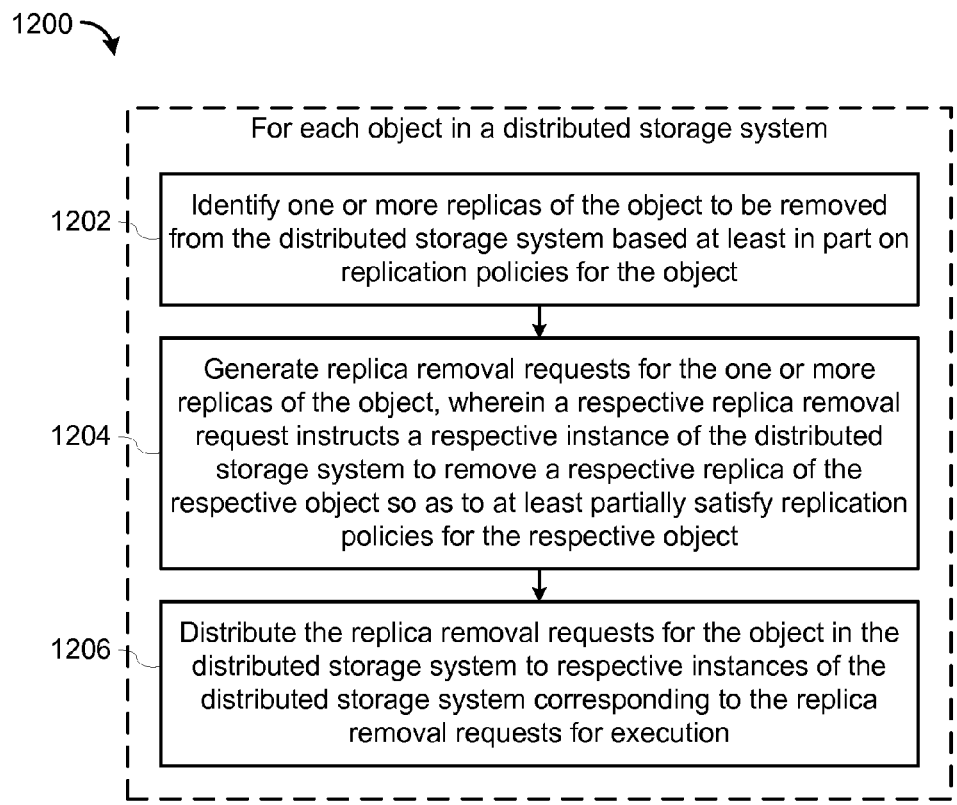
FIG. 12 is a flowchart of another method for generating and distributing replica removal requests for objects in a distributed storage system, according to some embodiments.

FIG. 12 is a flowchart of another method 1200 for generating and distributing replica removal requests for objects in a distributed storage system, according to some embodiments. The location assignment daemon 322 performs the following operations for each object in a distributed storage system. The location assignment daemon 322 identifies (1202) one or more replicas of the object to be removed from the distributed storage system based at least in part on replication policies for the object.

Next, the location assignment daemon 322 generates (1204) replica removal requests for the one or more replicas of the object, wherein a respective replica removal request instructs a respective instance of the distributed storage system to remove a respective replica of the respective object so as to at least partially satisfy replication policies for the respective object.

Figure 13:
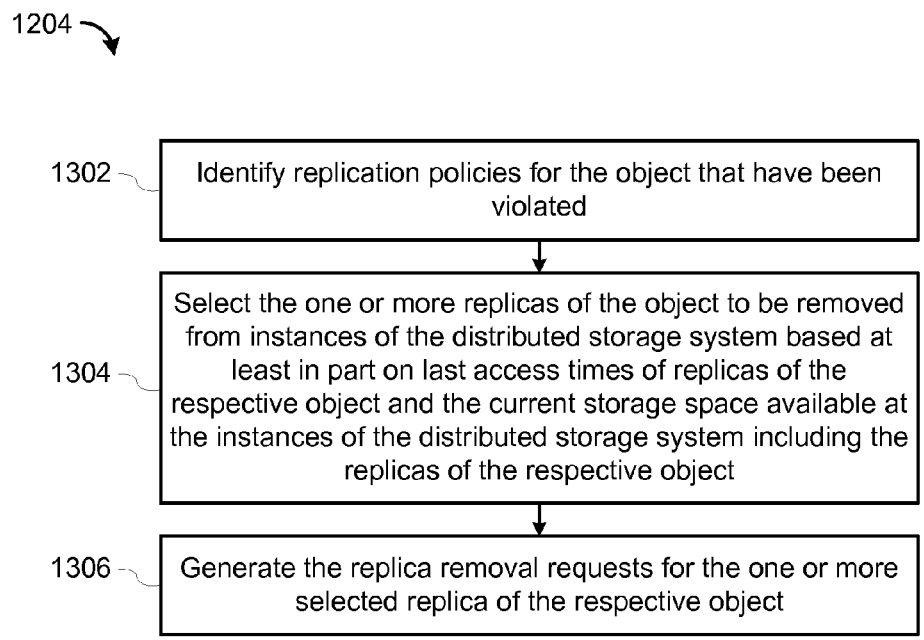
FIG. 13 is a flowchart of a method for generating replica removal requests for the one or more replicas of an object, according to some embodiments.

FIG. 13 is a flowchart of a method for generating (1204) replica removal requests for the one or more replicas of an object, according to some embodiments. The location assignment daemon 322 identifies (1302) replication policies for the object that have been violated. Next, the location assignment daemon 322 selects (1304) the one or more replicas of the object to be removed from instances of the distributed storage system based at least in part on last access times of replicas of the respective object and the current storage space available at the instances of the distributed storage system including the replicas of the respective object. The location assignment daemon 322 then generates (1306) the replica removal requests for the one or more selected replica of the respective object.

Figure 14:
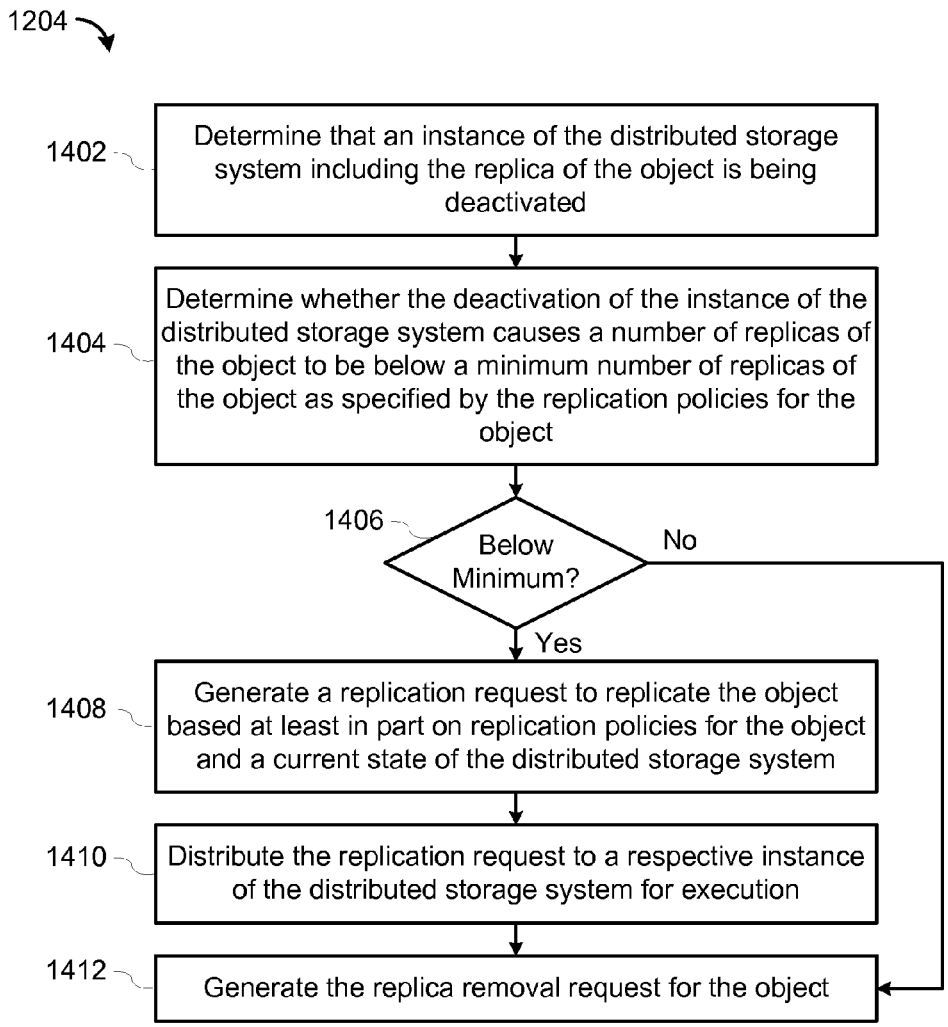
FIG. 14 is a flowchart of another method for generating replica removal requests for the one or more replicas of an object, according to some embodiments.

FIG. 14 is a flowchart of another method for generating (1204) replica removal requests for the one or more replicas of an object, according to some embodiments. The location assignment daemon 322 determines (1402) that an instance of the distributed storage system including the replica of the object is being deactivated. The location assignment daemon 322 then determines (1404) whether the deactivation of the instance of the distributed storage system causes a number of replicas of the object to be below a minimum number of replicas of the object as specified by the replication policies for the object.

If the deactivation of the instance of the distributed storage system causes the number of replicas of the object to be below the minimum number of replicas of the object (1406, yes), the location assignment daemon 322 generates (1408) a replication request to replicate the object based at least in part on replication policies for the object and a current state of the distributed storage system. Next, the location assignment daemon 322 distributes (1410) the replication request to a respective instance of the distributed storage system for execution. The location assignment daemon 322 then generates (1412) the replica removal request for the object only after the replication request to replicate the object has been completed.

If the deactivation of the instance of the distributed storage system does not cause the number of replicas of the object to be below the minimum number of replicas of the object (1406, no), the location assignment daemon 322 generates (1412) the replica removal request for the object.

Returning to FIG. 12, the location assignment daemon 322 then distributes (1206 the replica removal requests for the object in the distributed storage system to respective instances of the distributed storage system corresponding to the replica removal requests for execution.

In some embodiments, the replica removal request is handled by the blobmaster 204 of an instance that includes the replica that is to be removed.

In some embodiments, prior to removing replicas of objects, a replica removal request includes instructions to verify that the replicas of the object that are not being removed actually exist. In these embodiments, when the instance of the distributed storage system that is removing the replica of the object executes the replica removal request, the instance of the distributed storage system verifies the existence of the replicas of the object that are not being removed before removing its own replica of the object. Verifying the existence of the replicas of the object that are not being removed is important in a distributed storage system because a particular instance of the distributed storage system may no longer have the replica of the object (e.g., the object was deleted locally, data for the object is corrupted or missing, etc.). If the existence of the replicas of the object that are not being removed is not verified, the removal of a replica of the object may cause the number of replicas of the object to fall below the minimum number of replicas of the object as specified by the replication policies for the object. The level at which a particular replica of the object is verified may range from a bit-by-bit verification of the replica of the object to a simple confirmation by the instance including the particular replica that metadata for the particular replica exists at the instance.

Simulating a State of the Distributed Storage System

Often, it is desirable to simulate the effects of changes to the distributed storage system prior to implementing the changes. The simulation may not only simulate expected traffic (e.g., based on historical or user-specified trends), but may also simulate the management of replicas of objects described above.

Figure 15:
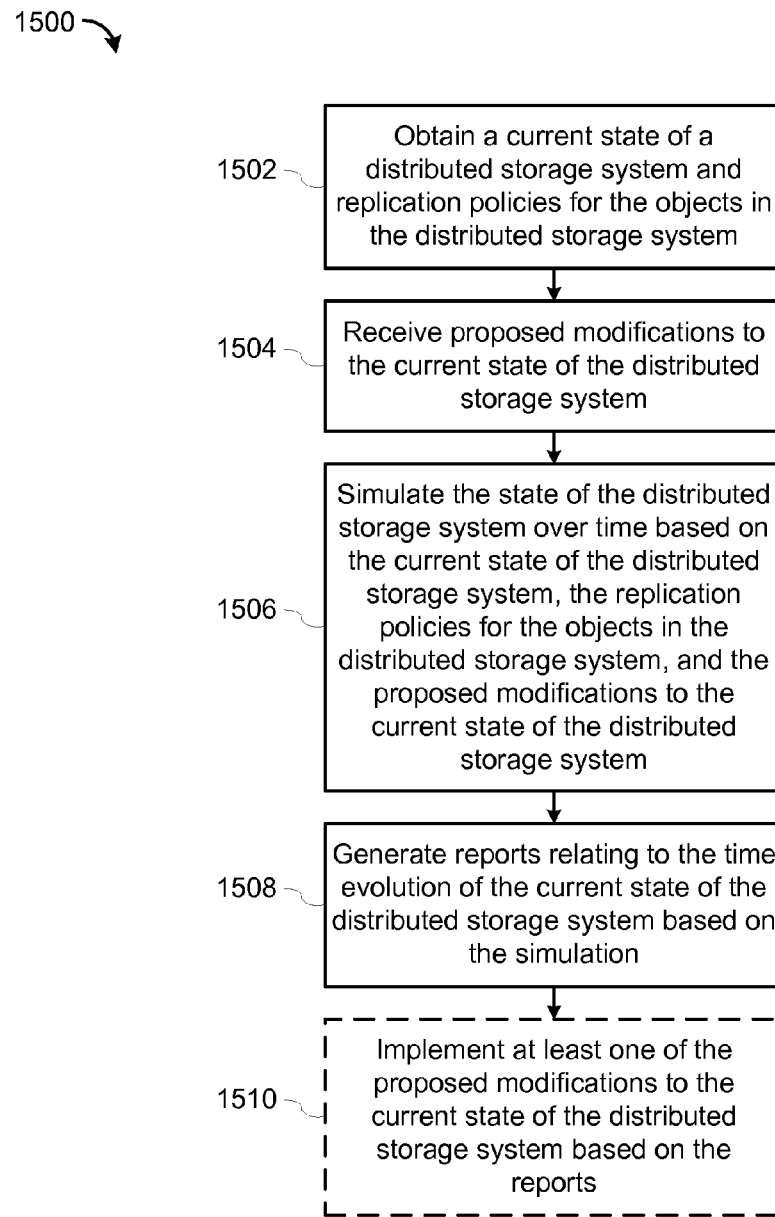
FIG. 15 is a flowchart of a method for simulating a state of a distributed storage system, according to some embodiments.

FIG. 15 is a flowchart of a method 1500 for simulating a state of a distributed storage system, according to some embodiments. The location assignment daemon 322 obtains (1502) a current state of a distributed storage system and replication policies for the objects in the distributed storage system. Next, the location assignment daemon 322 receives (1504) proposed modifications to the current state of the distributed storage system.

In some embodiments, a respective proposed modification to the current state of the distributed storage system includes information relating to the respective proposed modification to the current state of the distributed storage system and a time at which the respective proposed modification to the current state of the distributed storage system is to occur.

In some embodiments, a respective proposed modification to the current state of the distributed storage system is selected from the group consisting of an addition of storage space in the distributed storage system, a removal of storage space in the distributed storage system, an addition of instances of the distributed storage system, a removal of instances of the distributed storage system, an increase in the amount of data stored in the distributed storage system, a decrease in the amount of data stored in the distributed storage system, a modification to replication policies for objects in the distributed storage system, an addition of network resources in the distributed storage system, and a modification to an algorithm that generates replication requests.

The location assignment daemon 322 then simulates (1506) the state of the distributed storage system over time based on the current state of the distributed storage system, the replication policies for the objects in the distributed storage system, and the proposed modifications to the current state of the distributed storage system. The location assignment daemon 322 then generates (1508) reports relating to the time evolution of the current state of the distributed storage system based on the simulation. In some embodiments, the reports include a information relating to the time evolution of the current state of the distributed storage system (e.g., the used or available storage space, network traffic, the number of replicas of objects, the number of objects, etc.).

In some embodiments, the at least one of the proposed modifications to the current state of the distributed storage system are implemented (1510) based on the reports.

In some embodiments, the current trends in the state of the distributed storage system are simulated without applying proposed modification to the distributed storage system. These embodiments are typically used to extrapolate a future state of the distributed storage system based on the current trends (e.g., statistical trends) of the distributed storage system so that issues that might arise in the future can be brought to the attention of a system operator. In some embodiments, the extrapolated state of the distributed storage system is used to optimize the distributed storage system (e.g., adding storage capacity, adding servers, adding network links, adding data centers, etc.). For example, the extrapolated state of the distributed storage system may indicate that storage capacity in Brazil can be safely reduced by 50% while the storage capacity in Ireland should be increased by 25%.

The methods 700, 800, 900, 902, 1200, 1204, and 1500 may be governed by instructions that are stored in a computer readable storage medium and that are executed by one or more processors of one or more servers. Each of the operations shown in FIGS. 7-15 may correspond to instructions stored in a computer memory or computer readable storage medium. The computer readable storage medium may include a magnetic or optical disk storage device, solid state storage devices such as Flash memory, or other non-volatile memory device or devices. The computer readable instructions stored on the computer readable storage medium are in source code, assembly language code, object code, or other instruction format that is interpreted and/or executable by one or more processors.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for generating replication requests for objects in a distributed storage system, comprising:
   at a computer system including one or more processors and memory storing one or more programs, for execution by the one or more processors:
   generating replication requests for objects in a distributed storage system based at least in part on replication policies for the objects and a current state of the distributed storage system, wherein a respective replication request for a respective object instructs a respective instance of the distributed storage system to replicate the respective object so as to at least partially satisfy a replication policy for the respective object, wherein a respective replication policy includes criteria specifying at least storage device types on which replicas of object are to be stored;
   partitioning the replication requests into groups of respective replication requests corresponding to respective instances of the distributed storage system at which the respective replication requests are to be performed; and
   for a respective group of respective replication requests,
      determining a respective subset of replication requests for the respective group of respective replication requests that can be completed within a predetermined time interval; and
      distributing the respective subset of replication requests for the respective group of respective replication requests to the respective instance of the distributed storage system corresponding to the respective group of respective replication requests for execution.

2. The method of claim 1, wherein prior to distributing the at least the subset of the replication requests to the respective instances of the distributed storage system, the method further comprises:
   calculating priorities of the replication requests; and
   for a respective group of replication requests, sorting the replication requests in the group of replication requests by priority to produce a sorted group of replication requests.

3. The method of claim 2, wherein calculating a priority of a respective replication request includes calculating the priority of the respective replication request as a difference between a metric corresponding to a benefit of performing the respective replication request and a metric corresponding to a cost of performing the respective replication request.

4. The method of claim 1, wherein the predetermined time interval is the time interval between iterations of the generating, the partitioning, and the distributing.

5. The method of claim 1, further comprising discarding replication requests for the respective group of replication requests that are not included in the respective subset of replication requests for the respective group that can be completed within the predetermined time interval.

6. The method of claim 2, wherein distributing the respective subset of replication requests for the respective group of replication requests to a respective instance of the distributed storage system corresponding to the respective group of respective replication requests for execution includes distributing a respective sorted group of replication requests to the respective instance of the distributed storage system corresponding to the respective group of respective replication requests for execution.

7. The method of claim 1, wherein the current state of the distributed storage system includes:
- a current network state;
- current user quotas for storage space in the distributed storage system;
- storage space in the distributed storage system that are currently used by users;
- current storage space available at instances of the distributed storage system;
- current statuses of replication queues at instances of the distributed storage system;
- current planned maintenance operations zones; and
- a list of current replicas of objects in the distributed storage system.

8. The method of claim 1, wherein a replication policy for an object includes criteria selected from the group consisting of:
- a minimum number of replicas of the object that must be present in the distributed storage system;
- a maximum number of the replicas of the object that are allowed to be present in the distributed storage system;
- storage device types on which the replicas of the object are to be stored;
- locations at which the replicas of the object may be stored;
- locations at which the replicas of the object may not be stored; and
- a range of ages for the object during which the replication policy for the object applies.

9. A system for generating replication requests for objects in a distributed storage system, comprising:
- one or more processors;
- memory; and
- one or more programs stored in the memory, the one or more programs comprising instructions to:
  - generate replication requests for objects in a distributed storage system based at least in part on replication policies for the objects and a current state of the distributed storage system, wherein a respective replication request for a respective object instructs a respective instance of the distributed storage system to replicate the respective object so as to at least partially satisfy a replication policy for the respective object, wherein a respective replication policy includes criteria specifying at least storage device types on which replicas of object are to be stored;
  - partition the replication requests into groups of respective replication requests corresponding to respective instances of the distributed storage system at which the respective replication requests are to be performed; and
  - for a respective group of respective replication requests, determine a respective subset of replication requests for the respective group of respective replication requests that can be completed within a predetermined time interval; and
  - distribute the respective subset of replication requests for the respective group of respective replication requests to the respective instance of the distributed storage system corresponding to the respective group of respective replication requests for execution.

10. The system of claim 9, wherein prior to the instructions to distribute the at least the subset of the replication requests to the respective instances of the distributed storage system, the system includes instructions to:
- calculate priorities of the replication requests; and
- for a respective group of replication requests, sort the replication requests in the group of replication requests by priority to produce a sorted group of replication requests.

11. The system of claim 10, wherein the instructions to calculate a priority of a respective replication request include instructions to calculate the priority of the respective replication request as a difference between a metric corresponding to a benefit of performing the respective replication request and a metric corresponding to a cost of performing the respective replication request.

12. The system of claim 9, wherein the predetermined time interval is the time interval between iterations of the generating, the partitioning, and the distributing.

13. The system of claim 9, further comprising instructions to discard replication requests for the respective group of replication requests that are not included in the subset of replication requests for the respective group of replication requests.

14. The system of claim 10, wherein the instructions to distribute respective subset of replication requests for the respective group of replication requests to a respective instance of the distributed storage system corresponding to the respective group of respective replication requests for execution include instructions to distribute a respective sorted group of replication requests to the respective instance of the distributed storage system corresponding to the respective group of respective replication requests for execution.

15. The system of claim 9, wherein the current state of the distributed storage system includes:
- a current network state;
- current user quotas for storage space in the distributed storage system;
- storage space in the distributed storage system that are currently used by users;
- current storage space available at instances of the distributed storage system;
- current statuses of replication queues at instances of the distributed storage system;
- current planned maintenance operations zones; and
- a list of current replicas of objects in the distributed storage system.

16. The system of claim 9, wherein a replication policy for an object includes criteria selected from the group consisting of:
- a minimum number of replicas of the object that must be present in the distributed storage system;
- a maximum number of the replicas of the object that are allowed to be present in the distributed storage system;
- storage device types on which the replicas of the object are to be stored;

locations at which the replicas of the object may be stored;
locations at which the replicas of the object may not be stored; and
a range of ages for the object during which the replication policy for the object applies.

17. A non-transitory computer readable storage medium storing one or more programs configured for execution by a computer, the one or more programs comprising instructions to:
generate replication requests for objects in a distributed storage system based at least in part on replication policies for the objects and a current state of the distributed storage system, wherein a respective replication request for a respective object instructs a respective instance of the distributed storage system to replicate the respective object so as to at least partially satisfy a replication policy for the respective object, wherein a respective replication policy includes criteria specifying at least storage device types on which replicas of object are to be stored;
partitioning the replication requests into groups of respective replication requests corresponding to respective instances of the distributed storage system at which the respective replication requests are to be performed; and
for a respective group of respective replication requests,
determining a respective subset of replication requests for the respective group of respective replication requests that can be completed within a predetermined time interval; and
distribute the respective subset of replication requests for the respective group of respective replication requests to the respective instance of the distributed storage system corresponding to the respective group of the respective requests for execution.

18. The computer readable storage medium of claim 17, wherein prior to the instructions to distribute the at least the subset of the replication requests to the respective instances of the distributed storage system, the system includes instructions to:
calculate priorities of the replication requests; and
for a respective group of replication requests, sort the replication requests in the group of replication requests by priority to produce a sorted group of replication requests.

19. The computer readable storage medium of claim 18, wherein the instructions to calculate a priority of a respective replication request include instructions to calculate the priority of the respective replication request as a difference between a metric corresponding to a benefit of performing the respective replication request and a metric corresponding to a cost of performing the respective replication request.

20. The computer readable storage medium of claim 17, wherein the predetermined time interval is the time interval between iterations of the generating, the partitioning, and the distributing.

21. The computer readable storage medium of claim 17, further comprising instructions to discard replication requests for the respective group of replication requests that are not included in the subset of replication requests for the respective group of replication requests.

22. The computer readable storage medium of claim 18, wherein the instructions to distribute the respective subset of replication requests for the respective group of replication requests to a respective instance of the distributed storage system corresponding to the respective group of respective replication requests for execution include instructions to distribute a respective sorted group of replication requests to the respective instance of the distributed storage system corresponding to the respective group of respective replication requests for execution.

23. The computer readable storage medium of claim 17, wherein the current state of the distributed storage system includes:
a current network state;
current user quotas for storage space in the distributed storage system;
storage space in the distributed storage system that are currently used by users;
current storage space available at instances of the distributed storage system;
current statuses of replication queues at instances of the distributed storage system;
current planned maintenance operations zones; and
a list of current replicas of objects in the distributed storage system.

24. The computer readable storage medium of claim 17, wherein a replication policy for an object includes criteria selected from the group consisting of:
a minimum number of replicas of the object that must be present in the distributed storage system;
a maximum number of the replicas of the object that are allowed to be present in the distributed storage system;
storage device types on which the replicas of the object are to be stored;
locations at which the replicas of the object may be stored;
locations at which the replicas of the object may not be stored; and
a range of ages for the object during which the replication policy for the object applies.

* * * * *